(12) United States Patent
Paulson et al.

(10) Patent No.: US 10,589,841 B2
(45) Date of Patent: Mar. 17, 2020

(54) AIRCRAFT HUB FAIRING WITH MOVABLE MEMBERS

(71) Applicant: Bell Helicopter Textron Inc., Fort Worth, TX (US)

(72) Inventors: Jared M. Paulson, Fort Worth, TX (US); Tyler W. Baldwin, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 330 days.

(21) Appl. No.: 15/598,343

(22) Filed: May 18, 2017

(65) Prior Publication Data

US 2018/0334240 A1    Nov. 22, 2018

(51) Int. Cl.
| | |
|---|---|
| *B64C 11/14* | (2006.01) |
| *B64C 27/50* | (2006.01) |
| *B64C 7/00* | (2006.01) |
| *B64C 27/04* | (2006.01) |
| *B64C 29/00* | (2006.01) |

(52) U.S. Cl.
CPC ............ *B64C 11/14* (2013.01); *B64C 7/00* (2013.01); *B64C 27/04* (2013.01); *B64C 27/50* (2013.01); *B64C 29/0033* (2013.01)

(58) Field of Classification Search
CPC ......... B64C 11/14; B64C 11/28; B64C 27/04; B64C 27/50; B64C 27/33; B64C 7/00; B64C 29/0033
USPC .................................................. 416/1, 2, 94
See application file for complete search history.

(56) References Cited

U.S. PATENT DOCUMENTS

| | | | |
|---|---|---|---|
| 5,031,858 A | 7/1991 | Schellhase et al. | |
| 8,998,125 B2 | 4/2015 | Hollimon et al. | |
| 9,156,545 B1 | 10/2015 | Fenny et al. | |
| 2012/0292456 A1* | 11/2012 | Hollimon | B64C 27/28 244/7 A |

(Continued)

OTHER PUBLICATIONS

U.S. Department of Transportation; Federal Aviation Administration; Helicopter Flying Handbook 2012; Ch. 4 Helicopter Components, Sections, and Systems; 18 pages.

(Continued)

*Primary Examiner* — Hai H Huynh
*Assistant Examiner* — Gonzalo Laguarda
(74) *Attorney, Agent, or Firm* — Timmer Law Group, PLLC

(57) ABSTRACT

In one aspect, a spinner fairing includes a base configured to be fixed relative to a hub system; a movable spinner assembly movable relative to the base; the movable spinner assembly comprising a first movable member and a second movable member. Each first and second movable member being selectively configurable between a closed position and a contracted position, in which the movable spinner assembly has a decreased shape and/or volume. In another embodiment, a spinner fairing can include at least one static member and a moveable member. In still another embodiment, a rotor head fairing assembly includes an upper housing and a lower housing coupled to a hub system; the upper housing including an upper movable member; the lower housing comprising a lower movable member. In yet another embodiment, a rotor head fairing includes at least one moveable upper housing and lower housing.

21 Claims, 35 Drawing Sheets

(56) References Cited

U.S. PATENT DOCUMENTS

2013/0164129 A1* 6/2013 Rauber .................. B64C 27/33
                                                    416/1
2014/0271223 A1* 9/2014 Foskey .................. B64C 11/14
                                                    416/245 R

OTHER PUBLICATIONS

Sikorsky Boeing—SB1 Defiant Future Vertical Lift Helicopter; https://www.youtube.com/watch?v=hc9kujch7Zo; Apr. 12, 2017.

* cited by examiner

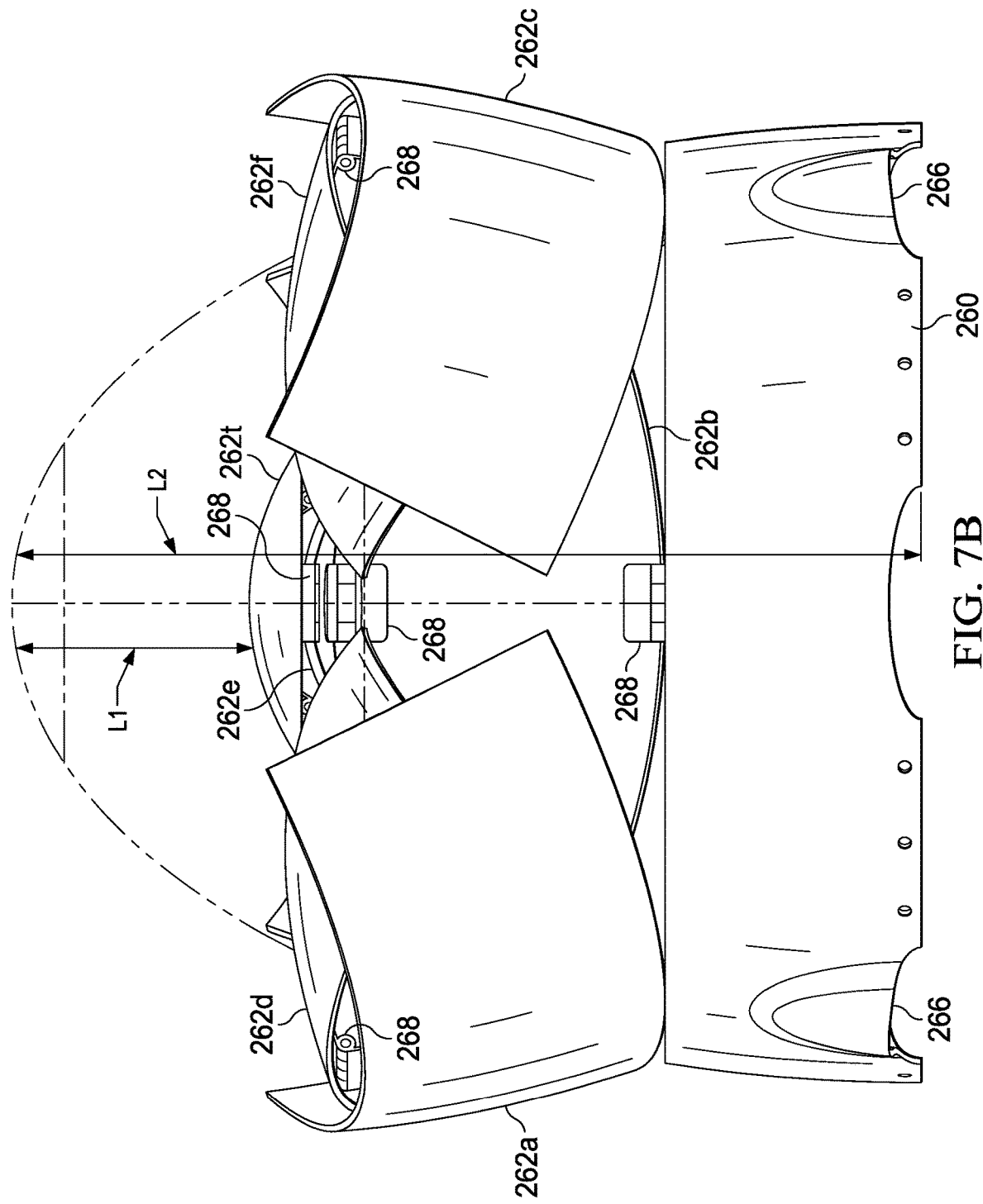

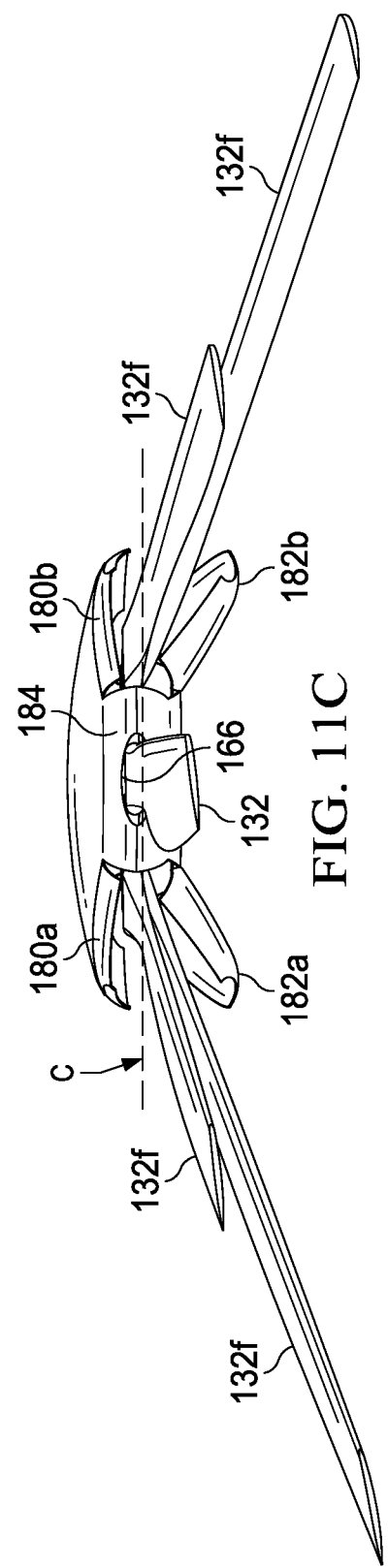

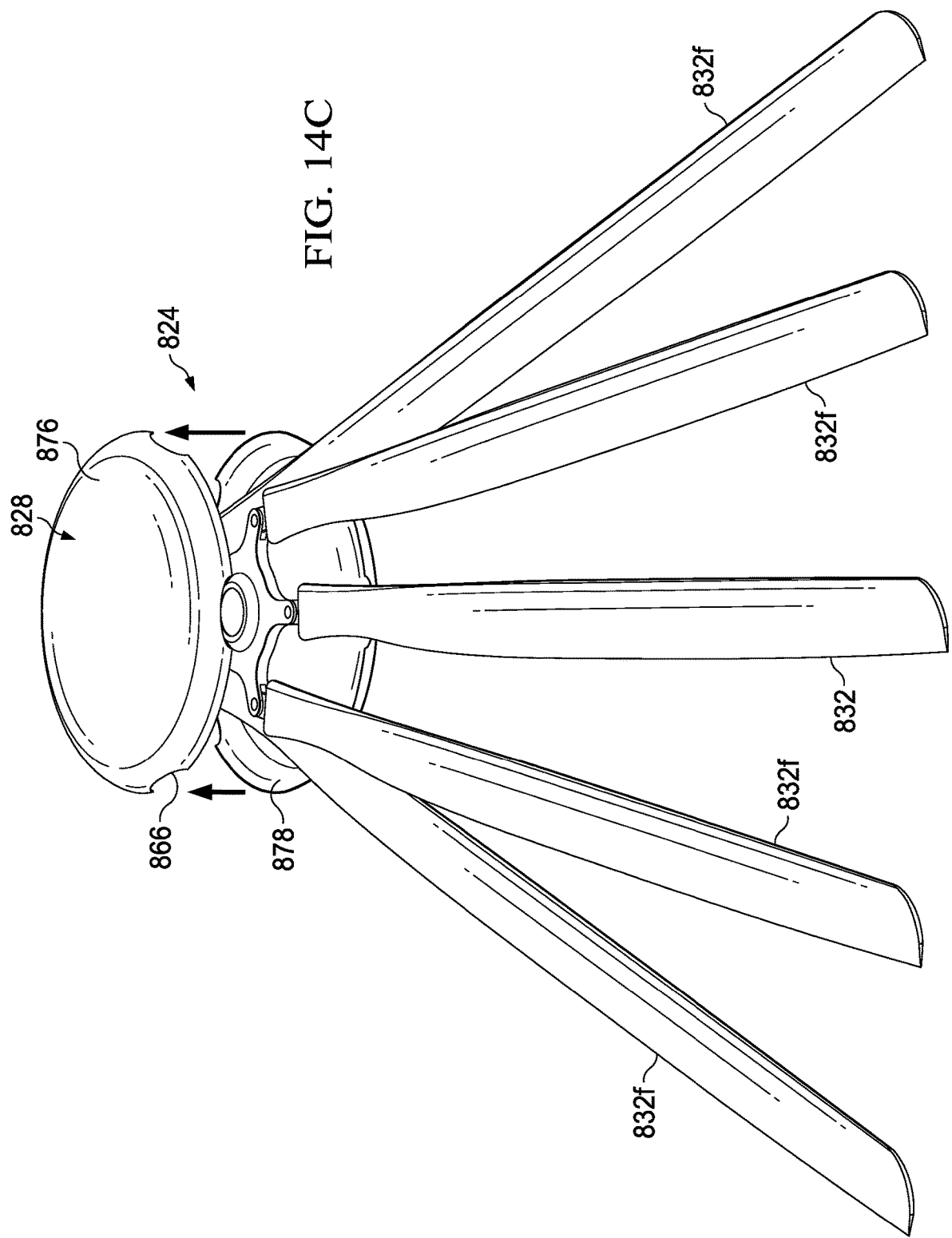

AIRCRAFT HUB FAIRING WITH MOVABLE MEMBERS

BACKGROUND

Technical Field

The present disclosure relates to a fairing for an aircraft with moveable members.

Description of Related Art

Rotary-wing aircraft or rotorcraft have long blades that are used to generate lift. Rotor blades increase the footprint of the aircraft making it difficult to store in restricted spaces such as on the deck of an aircraft carrier or in a hangar.

A spinner fairing is positioned to cover the hub of the rotor blades so as to reduce the overall aerodynamic drag of the aircraft. The spinner fairing is typically a dome shape that contributes to either the overall length or width of an aircraft. A longer, sharper shaped spinner is generally more aerodynamic but requires a large amount of space for storage. Accordingly, the design of a spinner fairing can be a compromise between aerodynamic performance and size.

There is a need for an improved contractable spinner fairing assembly.

SUMMARY

In a first aspect, there is provided a spinner fairing, including a base configured to be fixed relative to a hub system; a movable spinner assembly movable relative to the base; the movable spinner assembly including a first movable member and a second movable member; wherein each first and second movable member being selectively configurable between a closed position, in which the movable spinner assembly has an aerodynamic shape, and a contracted position, in which the movable spinner assembly has a decreased shape and/or volume.

In an embodiment, there is provided an actuating system mounted within the base for moving the movable spinner assembly.

In another embodiment, each first and second movable member can be pivotably mounted to the base.

In still another embodiment, when the movable spinner assembly is in a contracted position at least one of the first and second movable members extends radially outward from the base.

In yet another embodiment, when the movable spinner assembly is in a contracted position at least one of the first and second movable members is positioned inwardly towards the base.

In an exemplary embodiment, the first and second movable members are aft of a first forward member and a second forward member, at least one of the first forward member and the second forward member is positioned inwardly towards the base when in a contracted position.

In another embodiment, the base further includes a first static track and second static track, each first and second moveable members further include a movable track, the first movable track is configured to translate along the first static track during opening of the first movable member to a contracted position; and the second movable track is configured to translate along the second static track during opening of the second movable member to a contracted position.

In an exemplary embodiment, the at least one of the first static track and the first movable track further includes an endstop; and at least one of the second static track and the second movable track further includes an endstop.

In an embodiment, when the movable spinner assembly is in a contracted position the inner surfaces of the first and second movable members are adjacent to the base.

In a second aspect, there is a spinner fairing, including a base configured to be fixed relative to a hub system; and a movable spinner assembly. The movable spinner assembly including a first static member connected to the base; a first moveable member configured to be movably mounted to the first static member, the first moveable member arranged to cover a first access opening; a second static member connected to the base; and a second static member movably mounted to the second static member, the second movable member arranged to cover a second access opening. Each first and second movable members being selectively configurable between a closed position, in which the movable spinner assembly has an aerodynamic shape, and an open position, in which the movable spinner assembly includes first and second access openings.

In an embodiment, an actuating system is included for moving the first and second moveable members.

In an exemplary embodiment, the first movable member is pivotably mounted to the first static member, the second movable member is pivotably mounted to the second static member.

In still another embodiment, when the movable spinner assembly is in an open position at least one of the first and second movable members is extending radially outward from the base.

In yet another embodiment, the first static member further includes a first static track, the second static member further includes a second static track; each first and second moveable member further includes a movable track, the first movable track is configured to translate along the first static track during opening of the first movable member to the open position; and the second movable track is configured to translate along the second static track during opening of the second movable member to the open position.

In another embodiment, the base further includes a track on the forward edge for sliding at least one of the first and second movable members thereon.

In a third aspect, a rotor head fairing assembly includes an upper housing and a lower housing coupled to a hub system; the upper housing includes an upper movable member; the lower housing includes a lower movable member. Each upper and lower movable member is selectively configurable between a closed position, in which the upper housing and lower housing forms an aerodynamic shape, and an open position, in which the upper and lower movable members provide clearance for rotor blades in a stowed state.

In an embodiment, at least one of the upper moveable member and the lower movable member is pivotally connected to the respective housing.

In another embodiment, at least one of the upper moveable member and the lower movable member is configured to retract in a direction toward the hub system.

In still another embodiment, at least one of the upper moveable member and the lower movable member is slidable relative to the periphery of the respective housing.

In a fourth aspect, there is a rotor head fairing, including an upper housing and a lower housing coupled to a hub system; an actuating system for moving the lower housing; wherein the lower housing is selectively configurable between a closed position, in which the upper and lower housing together have an aerodynamic shape, and an open position, in which the lower housing is moved downward to provide clearance for rotor blades in a stowed position.

In a fifth aspect, there is a rotor head fairing, including an upper housing and a lower housing coupled to a hub system; an actuating system for moving the lower housing; wherein the upper housing is selectively configurable between a closed position, in which the upper and lower housing together have an aerodynamic shape, and an open position, in which the upper housing is moved upward to provide clearance for rotor blades in a stowed position.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 7B is a side view of the spinner fairing shown in FIG. 7A in a contracted position, according to one example embodiment;

FIG. 11C is a side isometric view of the rotor head fairing shown in FIG. 11A, according to one example embodiment;

FIGS. 14A-14C are isometric views of a rotor head with upper and lower housings in an open position, according to one example embodiment.

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
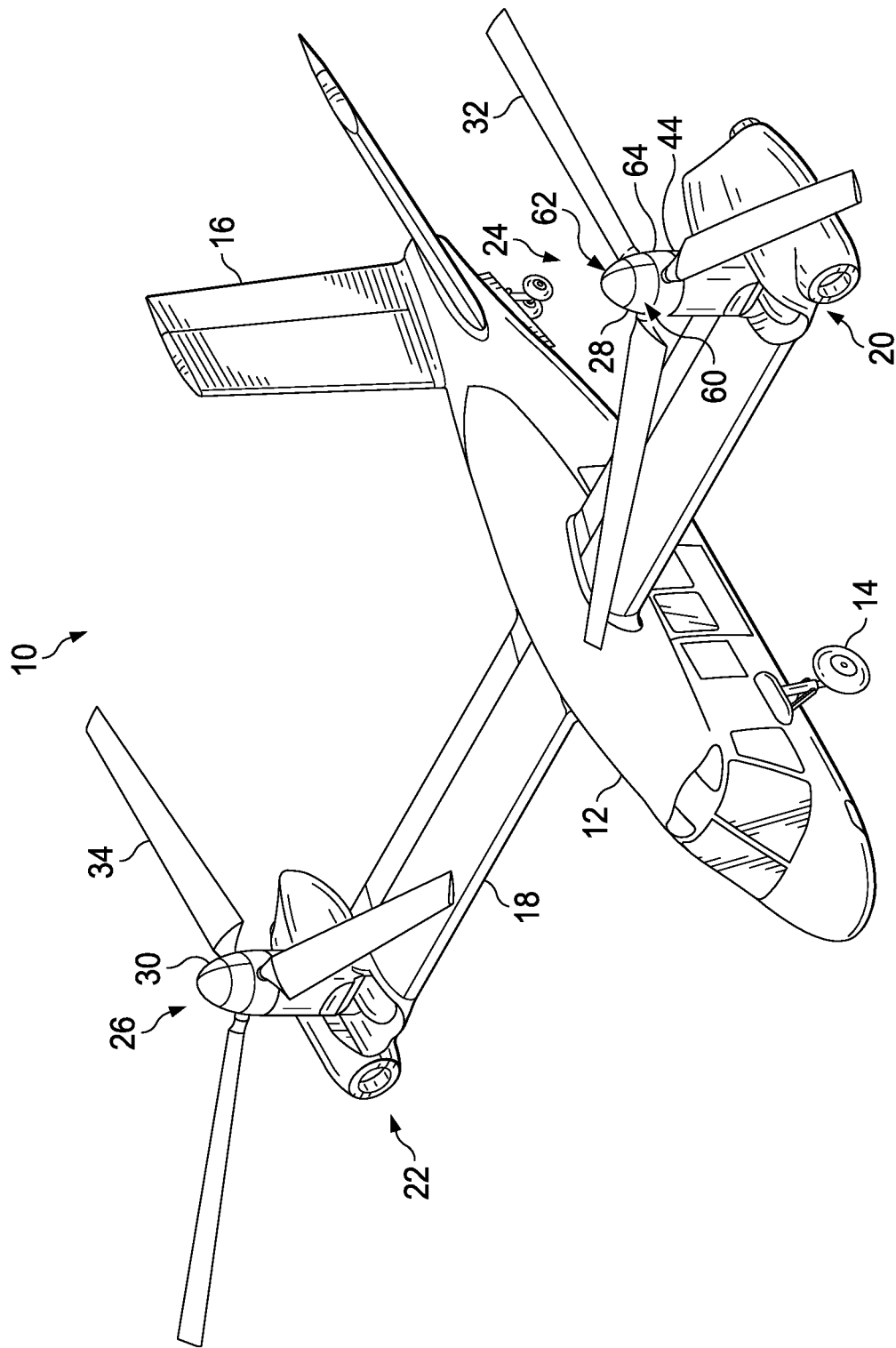
FIG. 1 is an isometric view of a tiltrotor aircraft in helicopter mode, according to one example embodiment.

This disclosure depicts and describes spinner fairing assemblies for aircraft. Referring now to the drawings wherein like reference characters identify corresponding or similar elements throughout the several views, FIGS. 1, 2A-2B, and 3-4 show two different rotary-wing aircraft utilizing aerodynamic spinner fairings and a rotor head fairing respectively associated with a hub system. FIG. 1 shows an isometric view of a tiltrotor aircraft 10, while FIG. 3 is a side view of a helicopter 110. Additionally the spinner fairing assemblies, components and features thereof, and methods relating thereto depicted and/or described herein can be used with any aircraft having a fairing associated with a hub system, including tiltrotor aircrafts, fixed wing aircrafts, turboprop aircrafts, helicopters, tilt wing aircrafts, unmanned aerial vehicles (UAVs), hovercrafts, and other vertical lift or VTOL aircrafts, or can further be used with any device having a fairing associated with a hub system. The spinner fairing assemblies described herein include at least one moveable members that can be moved manually or with an actuating system.

Referring to FIG. 1 in the drawings, a tiltrotor aircraft 10 is illustrated. Tiltrotor aircraft 10 can include a fuselage 12, a landing gear 14, a tail member 16, a wing member 18, a propulsion system 20, and a propulsion system 22. Each propulsion system 20, 22 can include a gearbox, an engine, and a rotatable rotor system 24, 26, respectively. Each rotor system 24, 26 has a spinner fairing 28, 30 enclosing a hub system to support a plurality of rotor blades 32, 34, respectively, associated therewith. Each propulsion system 20, 22 can be substantially symmetric of each other about the fuselage 12. The position of the rotor system 24 and 26 can be selectively controlled in order to selectively control direction, thrust, and lift of the tiltrotor aircraft 10.

FIG. 1 illustrates tiltrotor aircraft 10 in helicopter mode, in which the rotor systems 24 and 26 are positioned substantially vertical to provide a lifting thrust. Tiltrotor aircraft 10 can also operate in an airplane mode, in which rotor systems 24, 26 are positioned substantially horizontal to provide a forward thrust in which a lifting force is supplied by wing member 18. It should be appreciated that tiltrotor aircraft can be operated such that rotor systems 24, 26 are selectively positioned between airplane mode and helicopter mode, which can be referred to as a conversion mode.

Figure 2A:
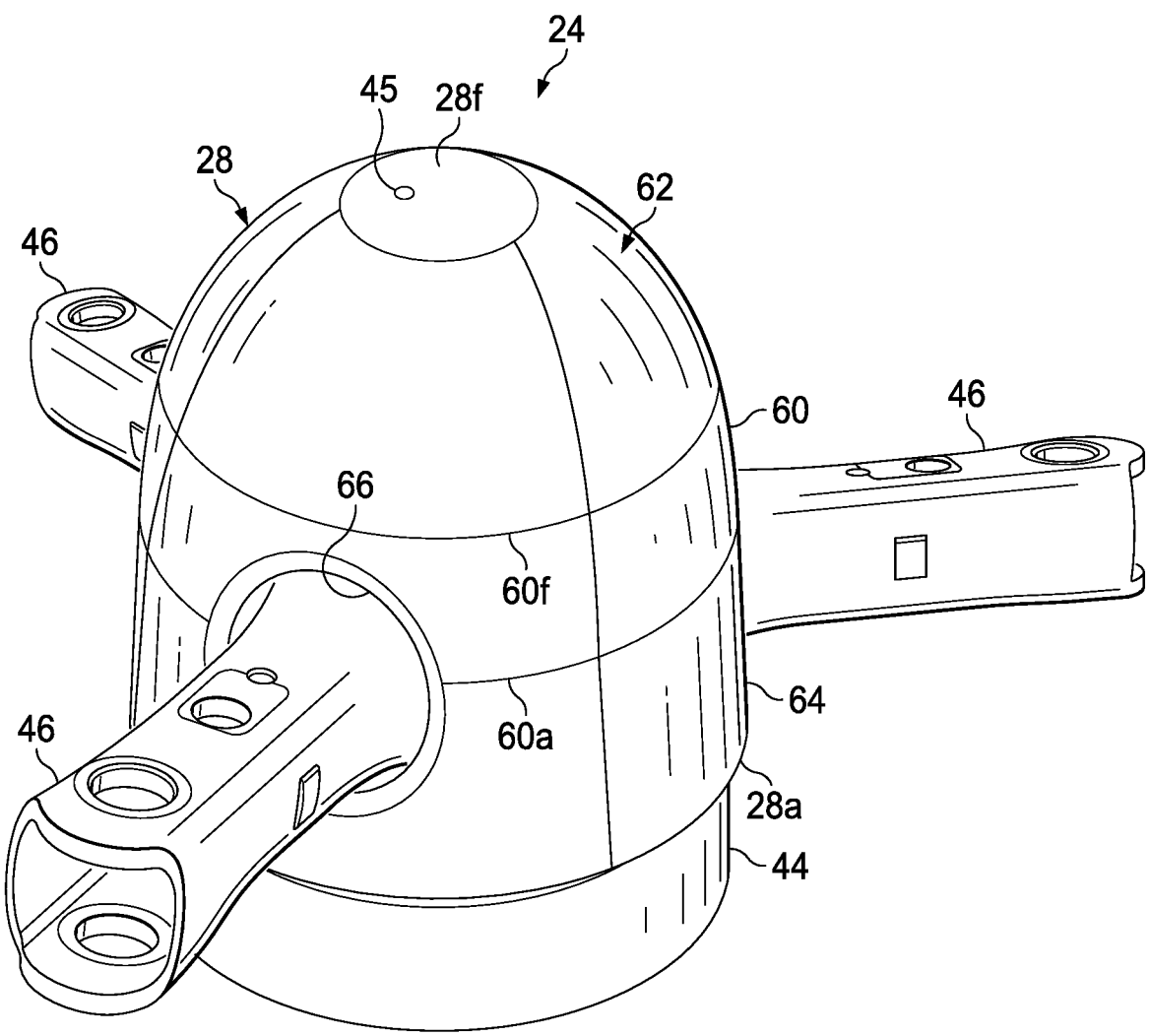
FIG. 2A is a perspective view of a spinner fairing, according to one example embodiment.
Figure 2B:
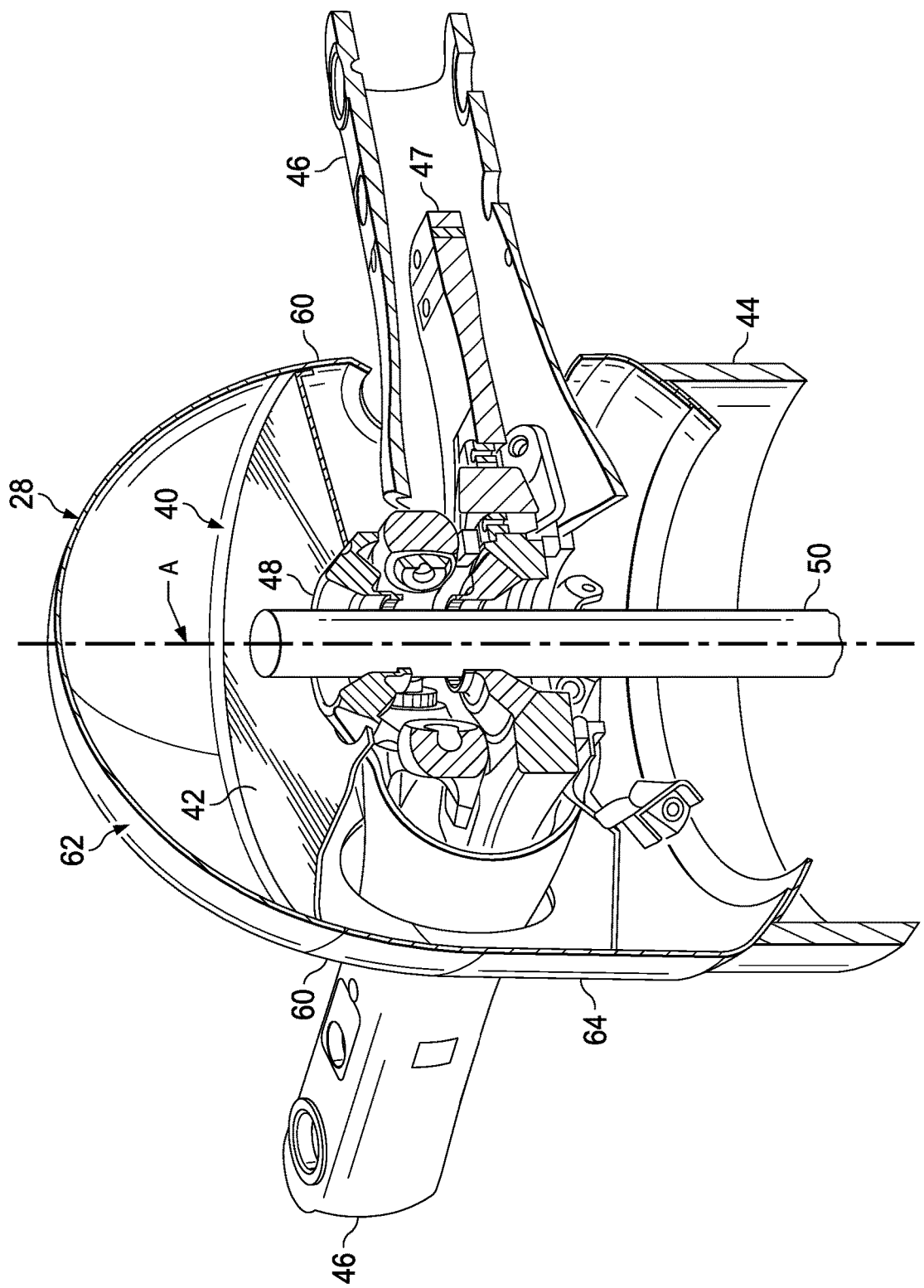
FIG. 2B is a partial cut away-view of a simplified mast and hub system associated with the spinner fairing shown in FIG. 2B, according to one example embodiment.
Figure 3:
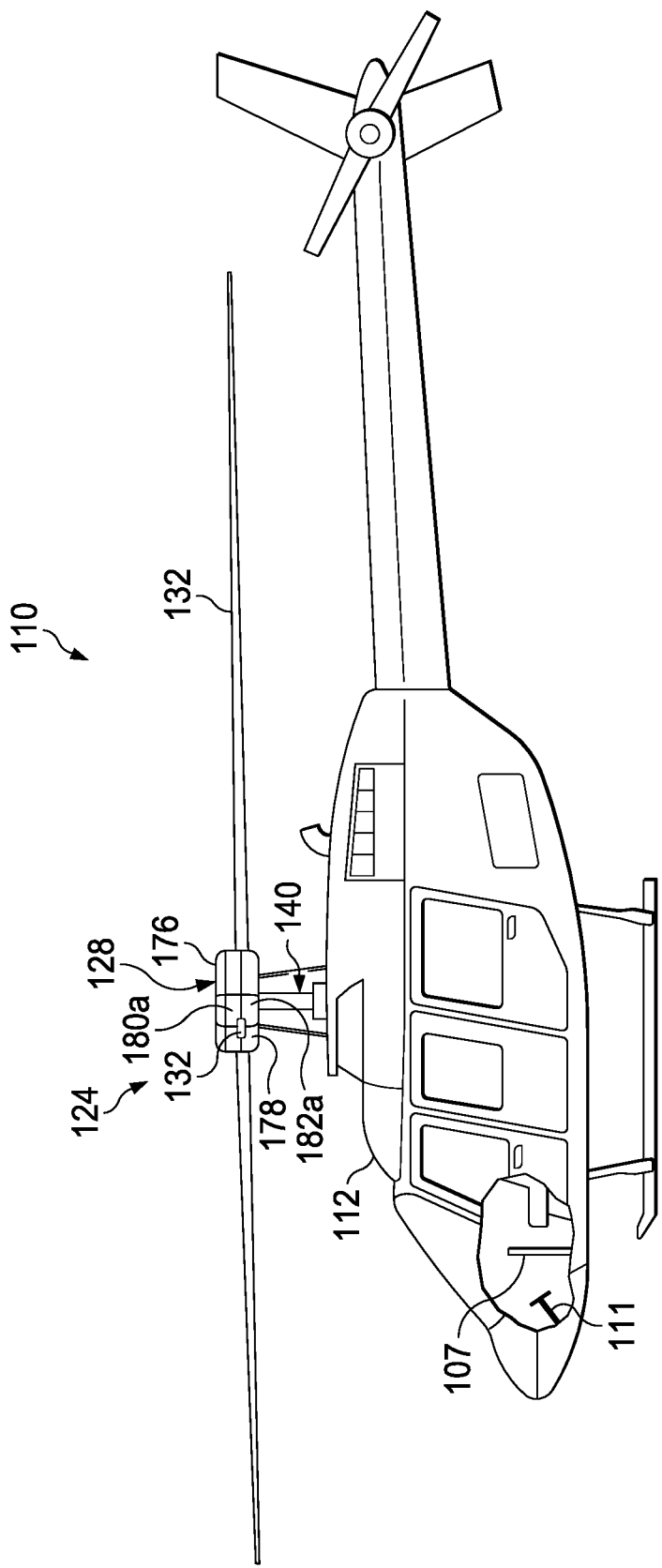
FIG. 3 is a side view of a helicopter, according to one example embodiment.

Referring to FIGS. 2A-2B an embodiment of a rotor system 24 is shown. Rotor system 24 may include a spinner fairing 28 and a hub system 40. Spinner fairing 28 can be securely attached to the hub system 40 at a spinner support 42. Spinner fairing 28 can be attached to the spinner support 42 using conventional fasteners such as rivets, screws, bolts. Spinner fairing 28 can be connected to a mast 50 (via the spinner support 42) in the hub system 40, allowing the hub system 40 to move independently within spinner fairing 28.

Figure 5A:
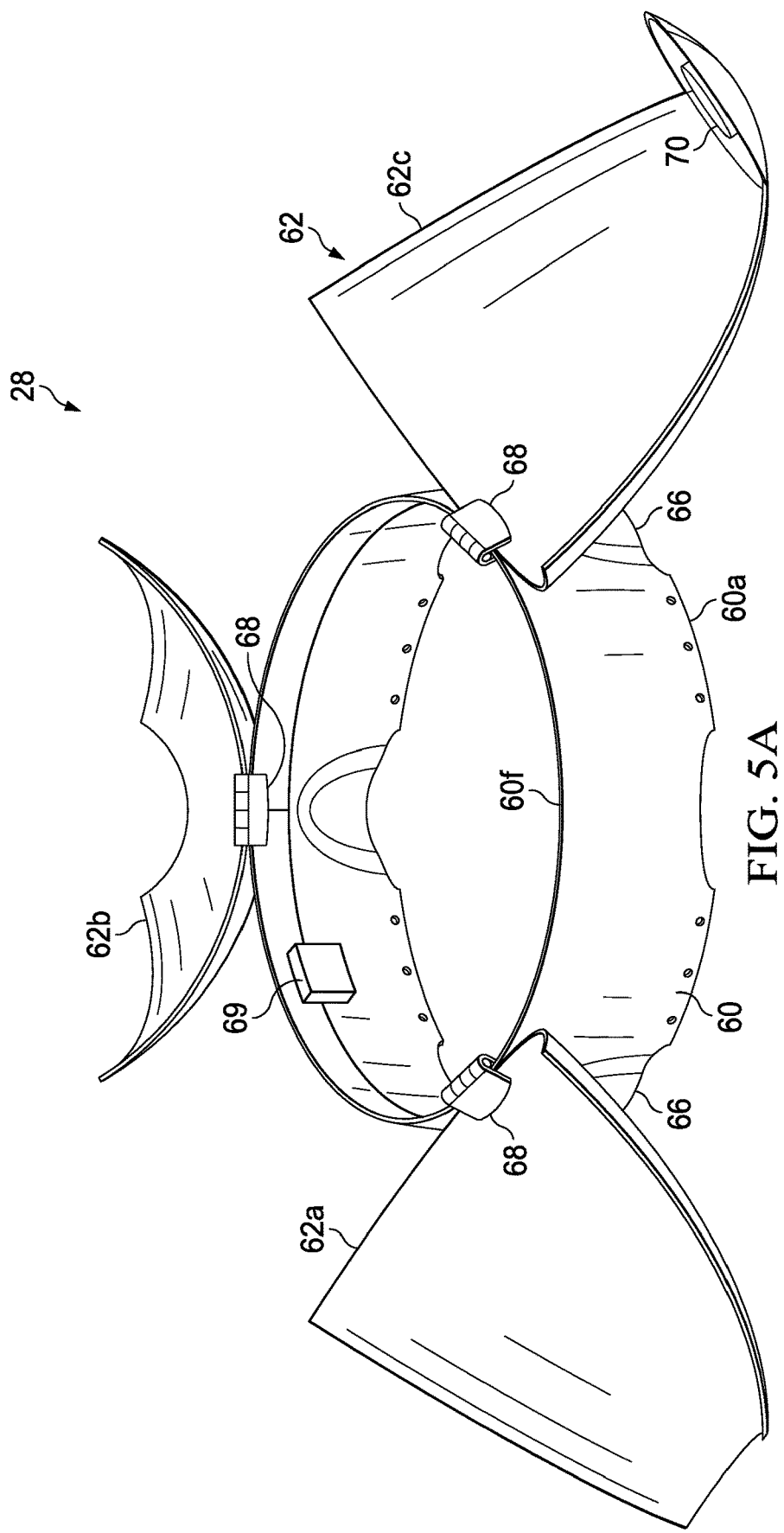
FIG. 5A is an isometric view of a spinner fairing with three movable members in a contracted position, according to one example embodiment.
Figure 5B:
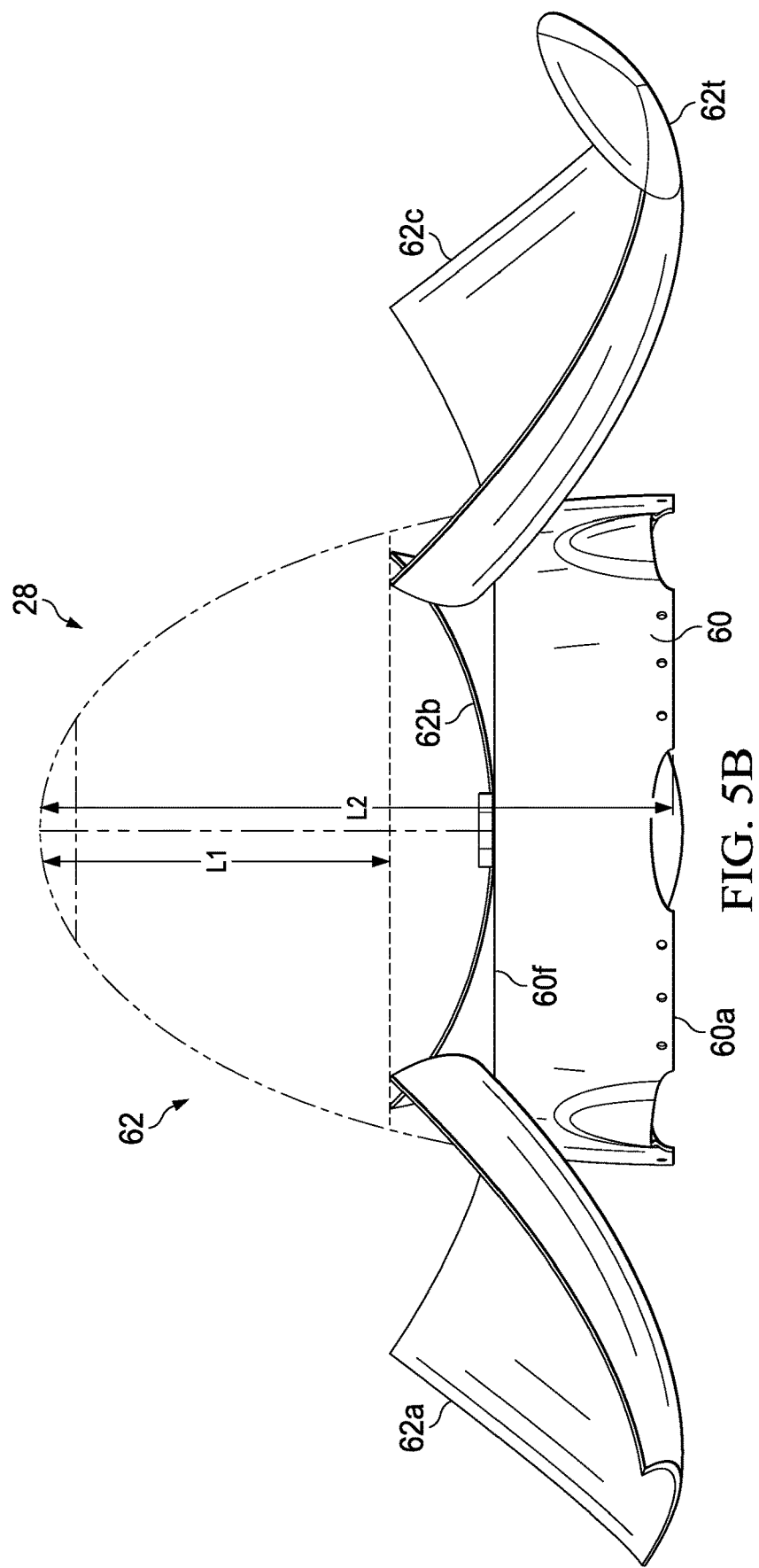
FIG. 5B is a side view of the spinner fairing shown in FIG. 5A, according to one example embodiment.
Figure 6:
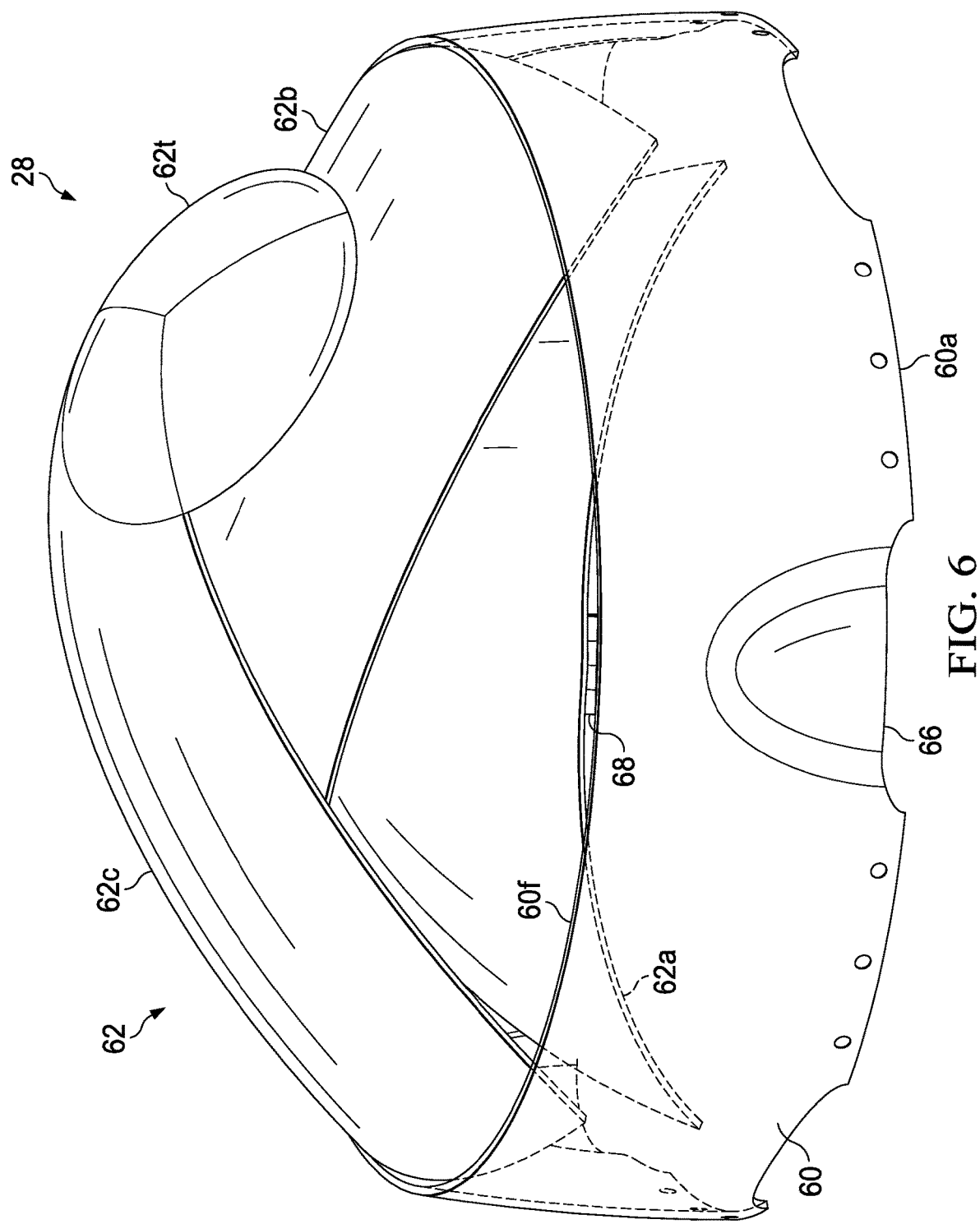
FIG. 6 is an isometric view of a spinner fairing in a contracted position, according to one example embodiment.
Figure 7A:
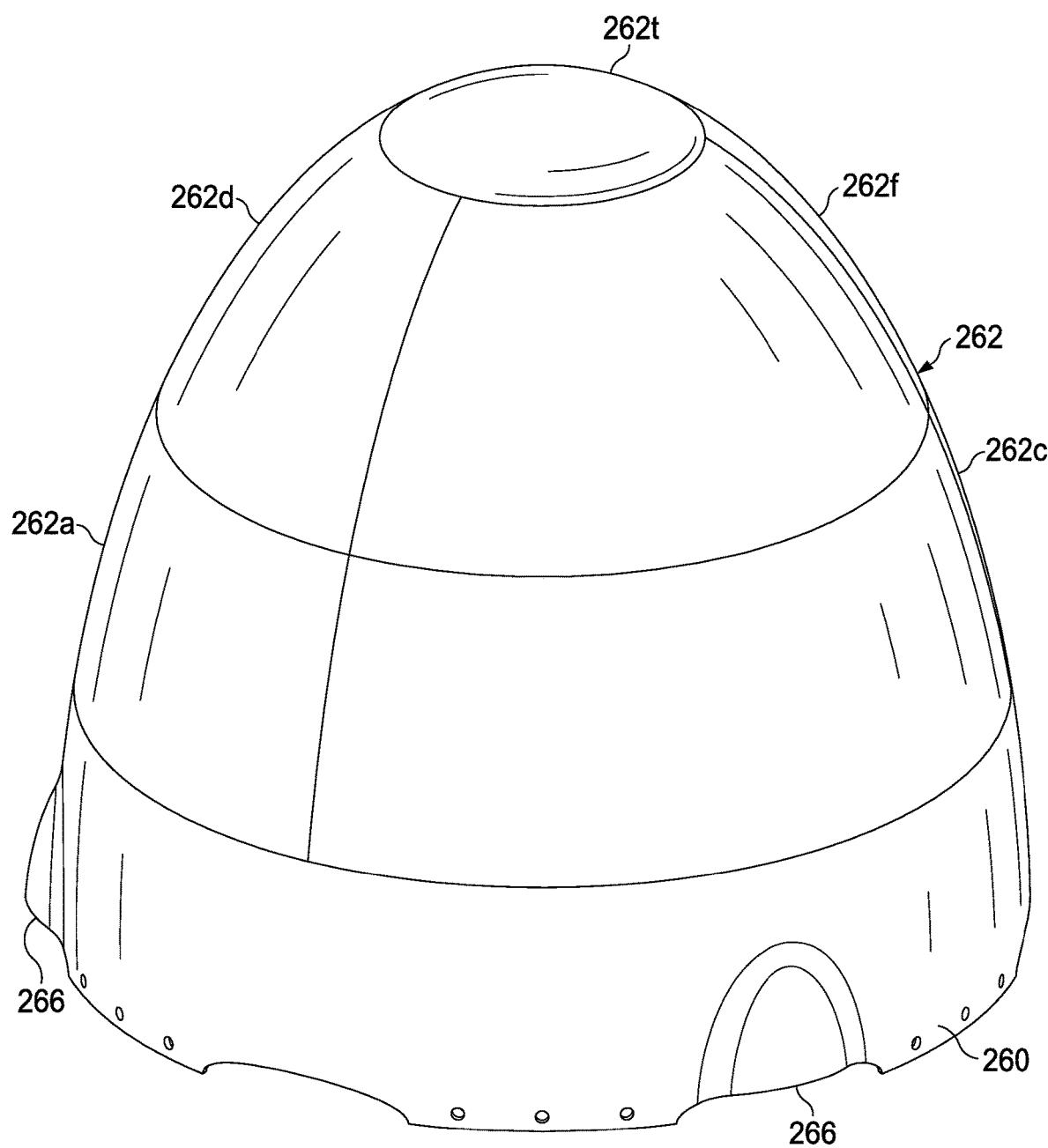
FIG. 7A is an isometric view of a spinner fairing with even movable members in a closed position, according to one example embodiment.
Figure 7C:
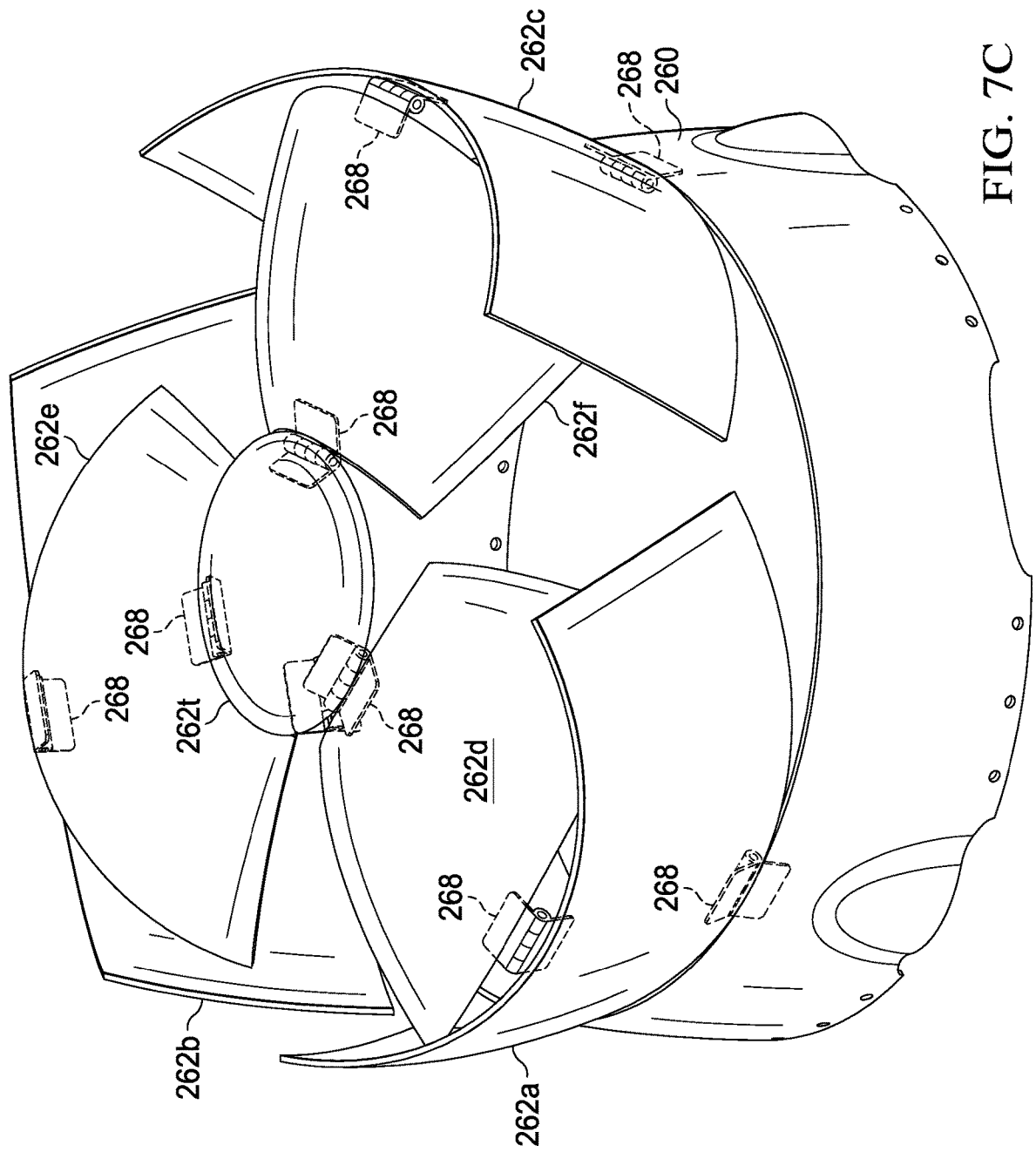
FIG. 7C is a top isometric view of the spinner fairing shown in FIG. 7B, according to one example embodiment.
Figure 7D:
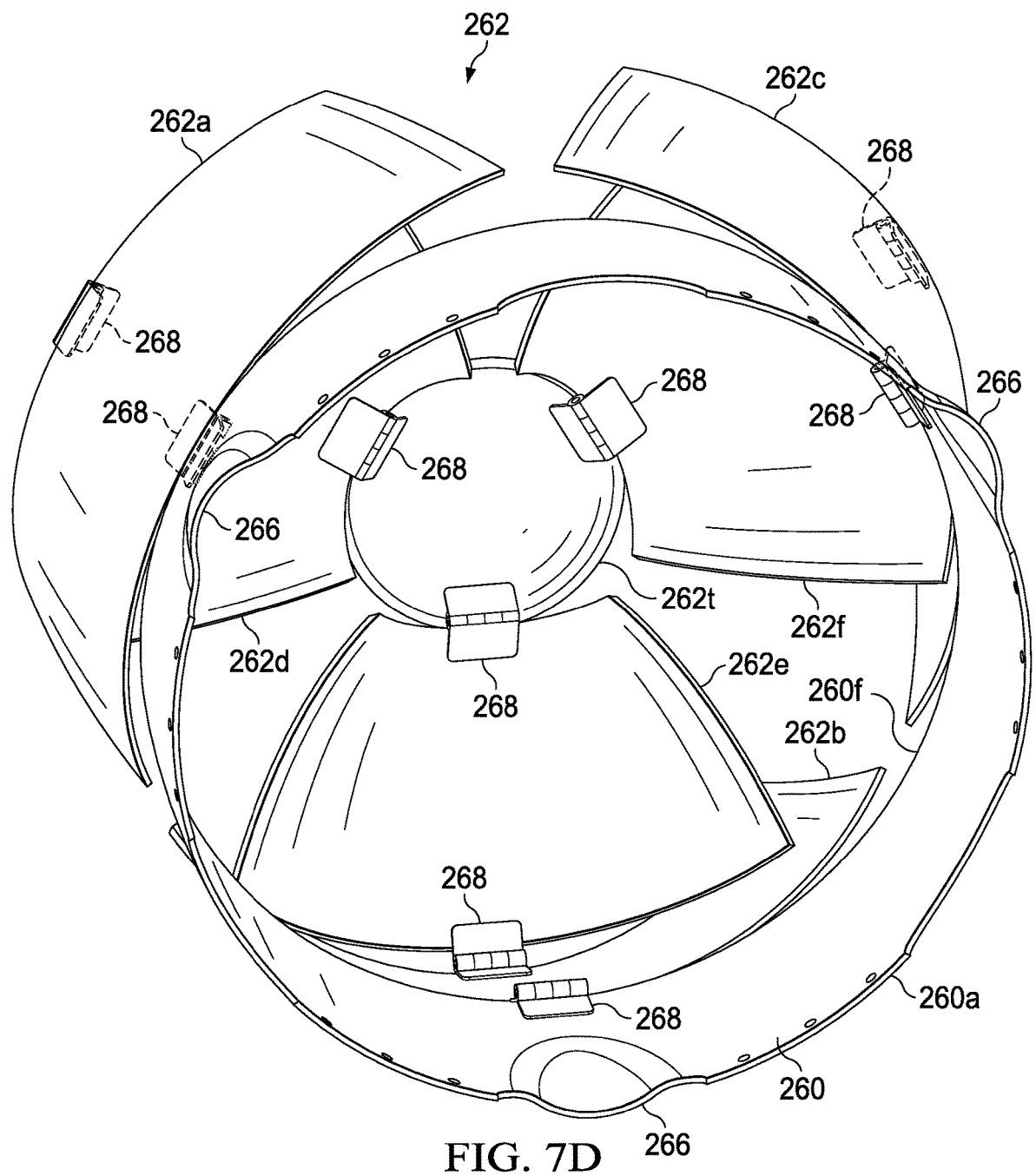
FIG. 7D is a bottom isometric view of the spinner fairing shown in FIG. 7B, according to one example embodiment.

Spinner fairing 28 can include movable components that move from a closed position, as shown in FIGS. 1 and 2A-2B, to an open position, as shown in FIGS. 5A-5B and 6. Spinner fairing 28 can include a movable spinner assembly 62 that is movable relative to a base 60. Spinner fairing 28 includes a forward end 28f and an aft end 28a. Base 60 includes a forward edge 60f and an aft edge 60a. Movable spinner assembly 62 can include movable components that can decrease the shape and/or volume of the spinner assembly 28 to provide clearance when the aircraft 10 is being stowed and/or to provide access to the hub system 40 for inspection and maintenance.

Base 60 and movable spinner assembly 62 may be formed of a metal, a plastic, a glass fiber, a carbon fiber, other composite materials, any other rigid or semi-rigid material, or combinations thereof. In an embodiment, the spinner assembly 62 has an overall aerodynamic shape when in a closed position that can be generally rounded (e.g., parabolic, conical, spherical, egg shaped, bullet shaped, bell shaped, etc.), axially symmetrical about an axis A.

Spinner fairing 28 can include a lower housing 64. Base 60 is above or forward of the lower housing 64. Base 60 and lower housing 64 can be coupled to define a plurality of fairing ports 66 to receive a plurality of cuffs 46.

Moveable spinner assembly 62, base 60, and spinner support 42 are positioned above or forward of a non-rotating lip 44. The non-rotating lip 44 is a fixed portion of the spinner fairing 28 and is associated with the nacelle airframe.

In some embodiments, spinner assembly 62 can include an optional inlet 45 for allowing air to pass into spinner support 42. This feature can provide an efficient cooling means to the devices within the spinner support 42.

During flight, spinner fairing 28 has an aerodynamic shape that diverts air towards rotor blades 32, thereby increasing the aerodynamic efficiency of the rotor system 24. The plurality of the rotor blades 32 are shown in flight mode in FIGS. 1 and 2A-2B. In order to protect the blades 32 while the aircraft 10 is stored, the rotor blades 32 can be rotated to a folded position to minimize the footprint of the aircraft 10.

Hub system 40 connects the blades 32 to the mast 50 to rotate the blades 32 while allowing them to move separately from the mast 50. It should be appreciated that hub system 40 may take on a wide variety of configurations. For example, hub system 40 can be a full articulated, a semi-rigid, rigid, combination, or other rotor system.

FIG. 2B is a simplified pictorial representation of a hub system 40. A "flapping spinner" is shown in FIG. 2B, which means the spinner fairing rides with the hub and is connected directly to the hub system 40 at the spinner support 42. Spinner fairing 28 can ride on the hub system 40 and follow the motions of the hub system 40. Hub system 40 can include spinner support 42, a plurality of cuffs 46, a yoke 47, a hub spring 48, and mast 50. Spinner support 42 can be a metallic plate or other suitably strong material that can support spinner fairing 28 and some electrical components. Yoke 47 can be configured to couple to mast 50 and the plurality of cuffs 46 for rotation therewith. Yoke 47 may include any other suitable rotor system components as would be appreciated by one of the ordinary skill upon viewing this disclosure. In an embodiment, yoke 47 allows blades 32 to rotate about the mast (e.g., to provide lift), to change pitch while rotating either collectively or cyclically (e.g., to accommodate vertical loads or to maneuver), to pivot within the yoke 47 plane that contains cuffs 46 (e.g., to provide lead-lag control), and/or any other articulation or movement as would be appreciated by one of ordinary skill in the art upon viewing this disclosure. Each of the plurality of cuffs 46 receives a rotor blade 32.

Hub spring 48 is coupled to the rotor mast 50 and yoke 47. Hub spring 48 is configured to react solely to or in any combination to thrust forces, shear forces, and moment loads. During operation, a collective change in pitch of rotor blades 32 can impart a thrust load between yoke 47 and rotor mast 50 which the hub spring 48 is configured to react thereto. Similarly, a cyclic change in the pitch of rotor blades 32 can cause shear and moment loads between yoke 47 and rotor mast 50 which the hub spring 48 can also be configured to react thereto. It should be appreciated that other operational forces can cause thrust, shear, and moment loads between yoke 47 and mast 50.

In FIGS. 5A-10C, various views of several embodiments of spinner fairing 28 are shown. Spinner fairing 28 can include a base 60 configured to be fixed relative to the hub system 40 and a movable spinner assembly 62. It will be appreciated that movable spinner assembly 62 provides an effective apparatus for decreasing the shape and/or volume of the spinner fairing 28 and/or to provide access to a hub system 40. It should be understood that the embodiments discussed herein can be incorporated in other aerodynamic fairing systems for tiltrotor aircraft, airplanes, and helicopters.

Referring specifically to FIGS. 5A-5B illustrate spinner fairing 28 including base 60 and movable spinner assembly 62 in an open or contracted position such that the spinner assembly 28 has a decreased shape and/or volume as compared to the closed aerodynamic shape used during operation of the aircraft 10. The movable spinner assembly 62 includes a first movable member 62a, a second movable member 62b, and a third movable member 62c pivotably mounted to the base 60. The contracted position shown in FIGS. 5A-5B decreases the shape and/or volume of the spinner fairing 28 by a length L1 as compared to the longer length L2 of the closed spinner fairing 28. This embodiment is particularly useful when the length of the rotor system 24 needs to be decreased during stowage of the aircraft 10. The length of the rotor system 24 can be decreased by a length L1 when the spinner fairing is in the contracted position as compared to the length of the rotor system 24 in a flight mode (when spinner fairing 28 has a total length L2).

In an embodiment, the movable spinner assembly 62 includes three movable aerodynamic components: first, second, and third movable members 62a, 62b, 62c. It is contemplated that the movable spinner assembly 62 could include a variety of configurations of the movable aerodynamic components that can include two, four, five, six, seven, eight, nine, ten, fifteen, twenty, twenty-five, or more movable aerodynamic components. In one embodiment, the movable spinner assembly 62 can include a first and second movable members 62a, 62b that are sized to each be a half of the closed shape shown in FIG. 2A.

It is further contemplated that the movable aerodynamic components of the movable spinner assembly 62 could come in a variety of shapes and sizes. First and second movable members 62a, 62b are generally a curved trapezoidal shape. Third movable member 62c is a generally curved trapezoidal shape including a rounded cap 62t at the forward end of 28f of the spinner assembly 28. In other embodiments, a moveable member can be a curved triangular shape or other suitable shape to achieve the desired decrease in shape and/or volume and/or to provide access to the hub system 40. In some embodiments, the first, second, and third movable members 62a, 62b, 62c are axisymmetric. In other embodiments, the first, second, and third movable members 62a, 62b, 62c are non-axisymmetric.

In an embodiment, the movable aerodynamic components of the movable spinner assembly 62 are adjacent to the base 60. In one embodiment, each of the first, second, and third movable members 62a, 62b, 62c are adjacent to the forward end 28f of the spinner fairing 28 and forward of the base 60. In other embodiments, some of the movable aerodynamic components are adjacent to the forward to the end 28f and other movable aerodynamic components are adjacent to the base 60, while still being forward of the base. In yet another embodiment, it is contemplated that at least one movable member can be included in the base 60.

The movable aerodynamic components in the movable spinner assembly 62 can each be a unitary structure or multiple components adhered, bonded, bolted or otherwise secured together. In an embodiment, at least some of the edges of the first, second, and third movable members 62a, 62b, 62c partially overlap or otherwise mate together to the edges of adjacent movable members and/or the forward edge 60f of the base 60 to improve aerodynamic performance of spinner fairing 28. For example, a side edge of first movable member 62a overlaps a side edge of third movable member 62c, an opposite side edge of first movable member 62a overlaps a side edge of second movable member 62b, a bottom edge of first movable member 62a overlaps the forward edge 60f of base 60, and a rounded top edge of first movable member 62a overlaps with an edge of rounded cap 62t. In some embodiments, there is no overlap or mating of the edges of the first, second, and third movable members 62a, 62b, 62c.

FIGS. 5A-5B show first, second, and third movable members 62a, 62b, 62c extended outward in the contracted position having a shape with a decreased length L1. In an embodiment, first, second, and third movable members 62a, 62b, 62c can be extended radially outward from base 60. Accordingly, this embodiment illustrates that at least a portion of at least the first, second, and/or third movable member 62a, 62b, 62c extends beyond the perimeter of the base 60.

A plurality of linkages 68 are provided to attach first, second, and third members 62a, 62b, 62c to the base 60. The plurality of linkages 68 can be any device that is capable of allowing two objects to rotate relative to each other about a fixed axis of rotation. In one embodiment, the plurality of linkages 68 can be one or more internal hinges made out of metal, such as aluminum or steel. In an embodiment, linkages 68 can permit rotation of the movable members 62a, 62b, 62c up to 180 degrees depending on the geometry of the movable members 62a, 62b, 62c.

The first, second, and third members can be moved manually or by an actuating system 69. An actuating system 69 is schematically shown and operably connected to the plurality of linkages 68. In one embodiment, actuating system 69 can include a plurality of actuators such that an actuator is associated with each of the first, second, and third movable members 62a, 62b, 62c. Actuating system 69 may be an electric actuator that can actuate first, second, and third movable members 62a, 62b, 62c. It should be appreciated, however, that this embodiment is but one example of different types of actuators and linkage combinations, configurations, and/or constructions that can be provided. In some embodiments, actuating system 69 can be a linear actuator, rotary actuator, or still another type of actuator. The drive mechanism of actuating system 69 may be a hydraulic device, mechanical device, pneumatic device, electromagnetic solenoid, electric motor, and combinations thereof. In an embodiment, the actuating system 69 can be at least one of the following: an electric linear actuator, an electric rotary actuator, and an electric ball screw actuator.

In some embodiments, the plurality of linkages 68 can include a locking mechanism including retractable pins, hooks, locks, or any type of retainer structure. The movable spinner assembly 62 is locked in flight such that the movable members 62a, 62b, 62c do not accidentally deploy in flight. Manual or automatic locking systems can be used and can be integrated with the actuating system 69. In the embodiment shown in FIGS. 5A-5B, a locking system 70 is provided and schematically shown associated with rounded cap 62t. Lock system 70 can selectively engage the first, second, and third movable members 62a, 62b, 62c into a closed position such that the spinner fairing has an aerodynamic shape for flight operations and disengage the members for the contracted or open position.

FIG. 6 shows another embodiment of the movable spinner assembly 62 in a contracted position with the first, second, and third movable members 62a, 62b, 62c positioned inwardly towards the base 60. The first movable member 62a is folded inward and in a bottom or aft location, the second movable member 62b is also folded inward above the first movable member 62a, and the third movable member 62c is folded inward above the second movable member 62b. Accordingly, the first, second, and third movable members 62a, 62b, 62c are within the perimeter of base 60 and has a decreased length. In an embodiment, at least one of the first, second, and third movable members 62a, 62b, 62c can be folded inward up to 180 degrees.

Referring now to FIGS. 7A-7D, an alternative embodiment of the movable spinner assembly 262 is illustrated. Movable spinner assembly 262 is substantially similar in form and function to the assembly 62, except as noted herein. Thus, disclosure herein regarding assembly 62 is also applicable to assembly 262, except as noted herein. In the illustrated embodiment, a plurality of forward movable members 262d, 262e, 262f is included. In an embodiment, the plurality of forward movable members 262d, 262e, 262f are in an upper portion of the movable spinner assembly 262 and the first, second, and third movable members 262a, 262b 262c are aft or in a lower portion of the movable spinner assembly 262. The forward of movable members can be a fourth movable member 262d pivotably mounted to the first movable member 262a, a fifth movable member 262e pivotably mounted to the second movable member 262b, and a sixth movable member 262f pivotably mounted to the third movable member 262c. Rounded cap 262t is pivotably mounted to the fourth, fifth, and six movable members 262d, 262e, 262f. In the contracted position, cap 262t is actuated inward, which can also cause the plurality of forward movable members 262d, 262e, 262f to be actuated inward toward the base, while actuating the movable members 262a, 262b, 262c outward. The contracted position of the movable spinner assembly 262 decreases the shape and/or volume thereof by a length L1 as compared to the length L2 of the closed position movable spinner shown in FIG. 7A. The shape and/or volume of the movable spinner assembly 262 is decreased in the contracted position as compared to the closed position shown in FIG. 7A.

Figure 8A:
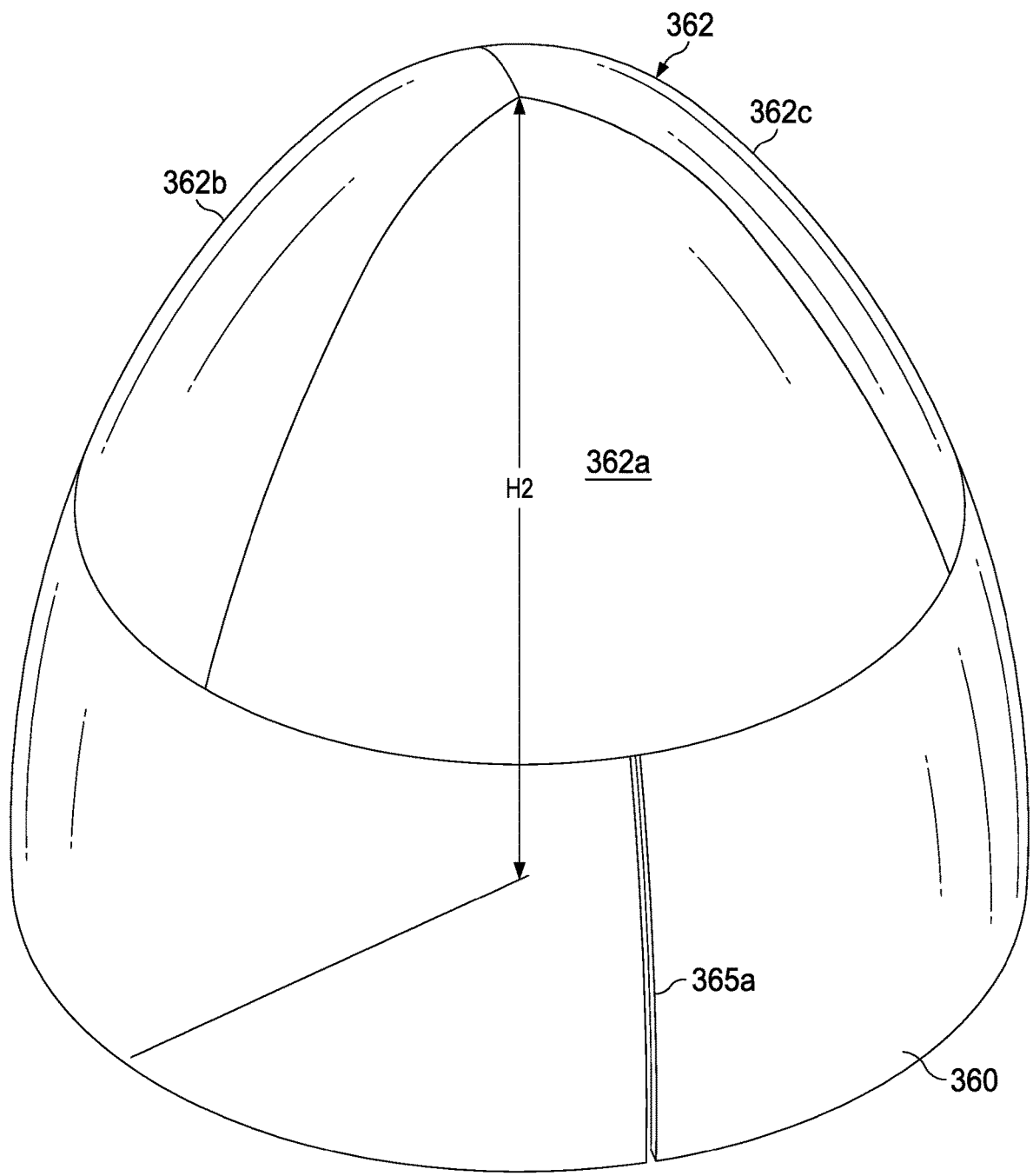
FIGS. 8A-8B are perspective views of a spinner fairing with three movable members in a closed position, according to one example embodiment.
Figure 8B:
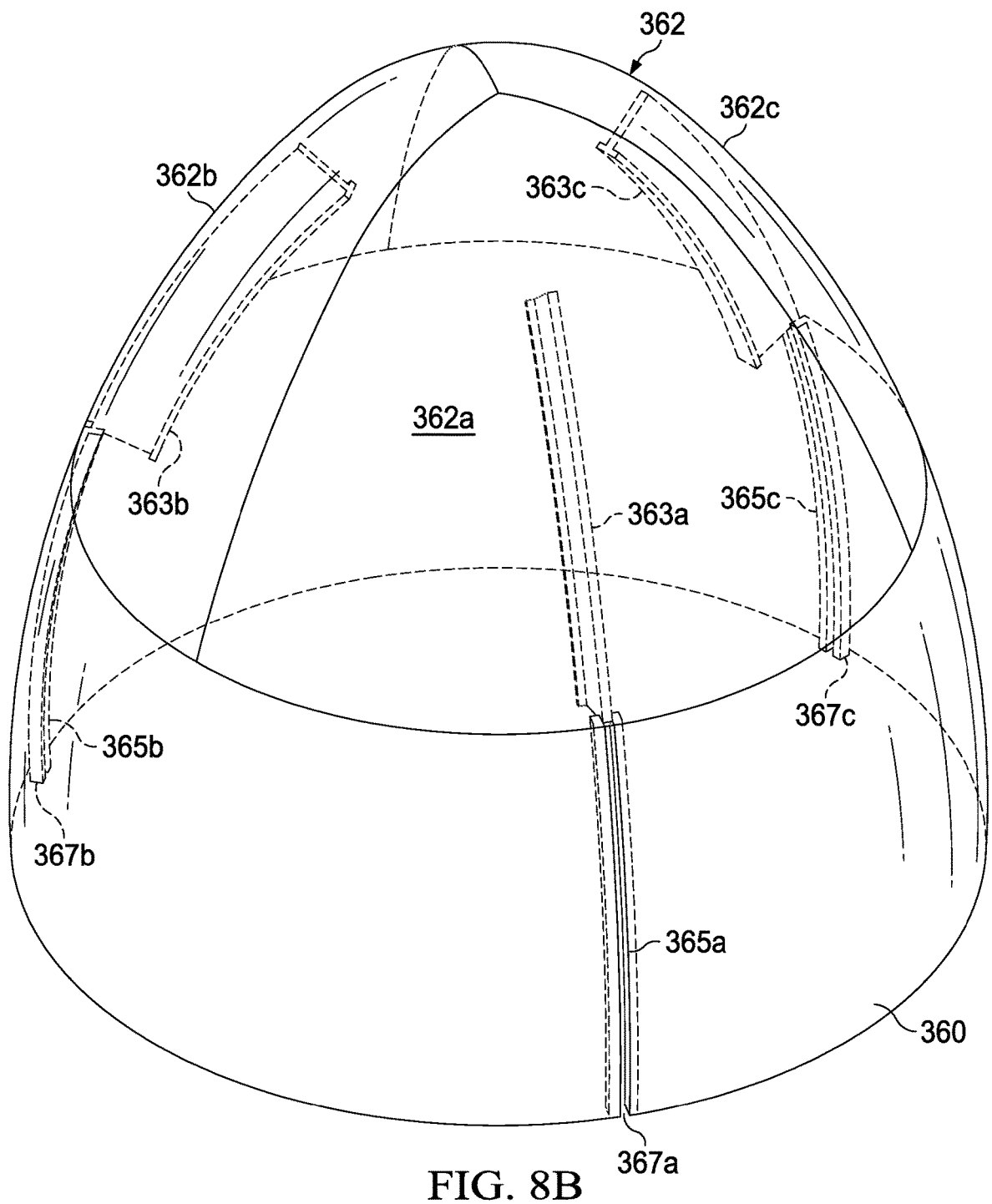
Figure 8C:
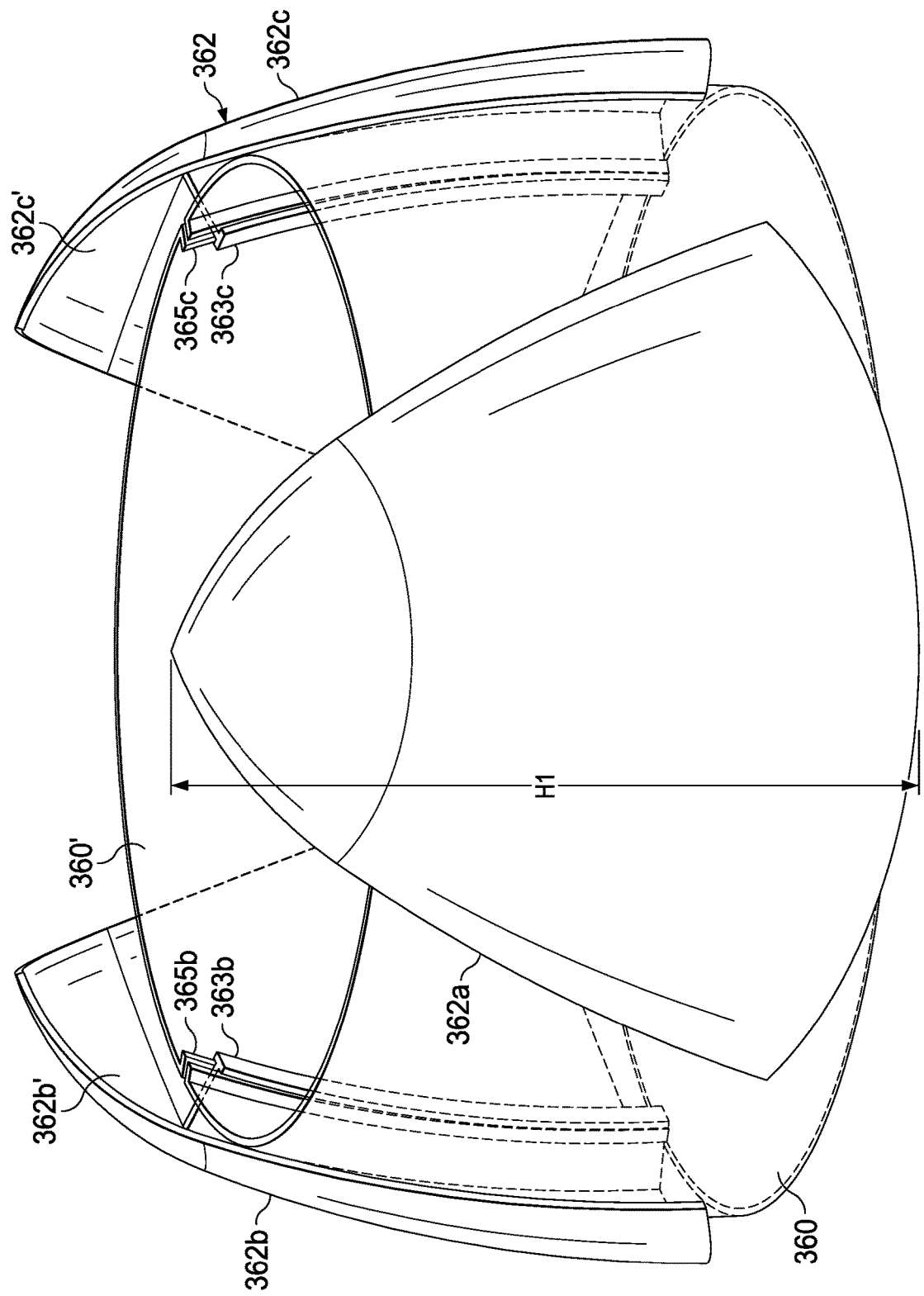
FIGS. 8C-8D are isometric views of the spinner fairing shown in FIGS. 8A-8B in a contracted position, according to one example embodiment.
Figure 8D:
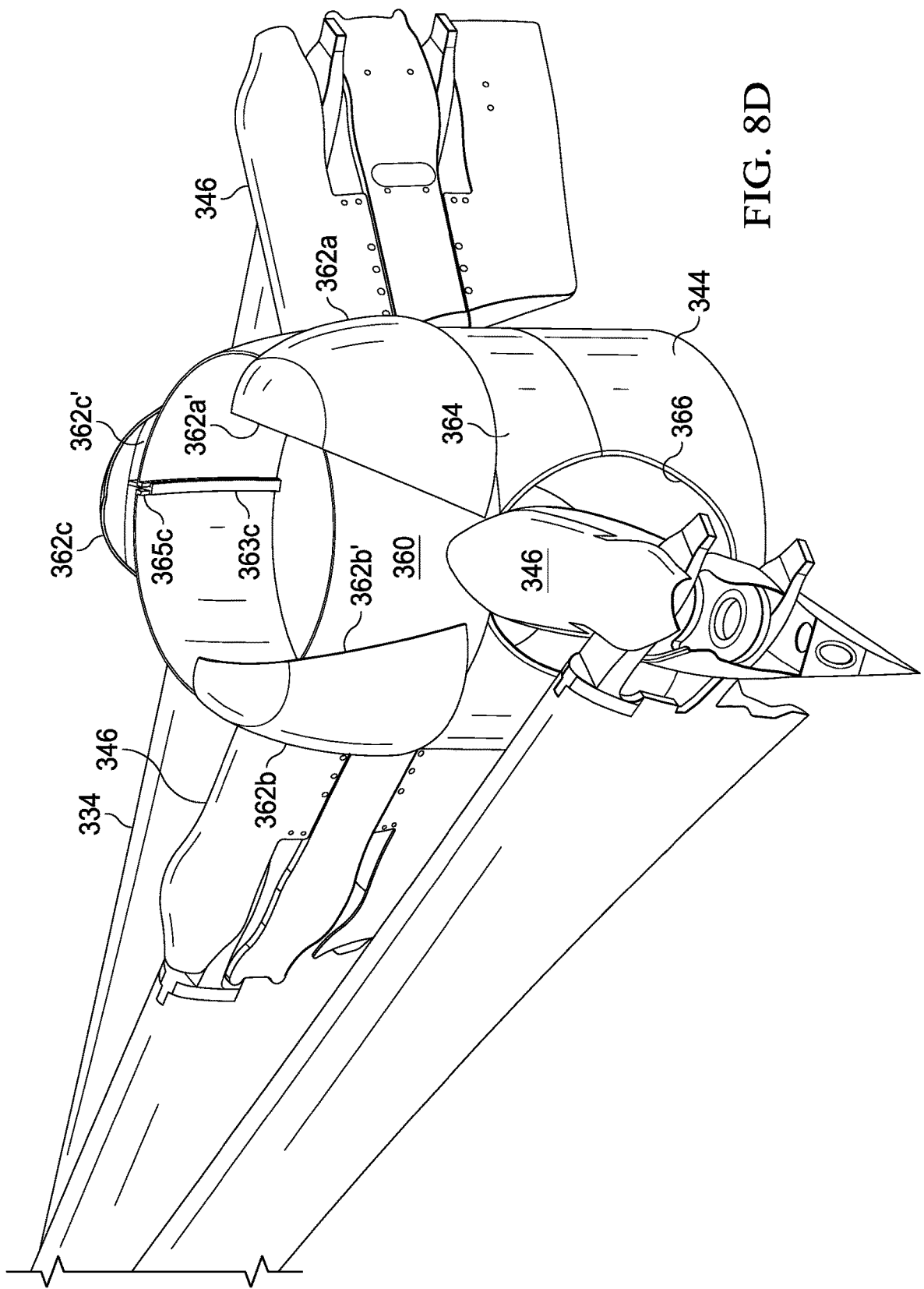

Referring now to FIGS. 8A-8D, an alternative embodiment of the movable spinner assembly 362 is illustrated. Movable spinner assembly 362 is substantially similar in form and function to the assembly 62, except as noted herein. Thus, disclosure herein regarding assembly 62 is also applicable to assembly 362, except as noted herein. The inner surfaces 362a', 362b', 362c' of the first, second, and third movable members 362a, 362b, 362c each includes a movable track 363a, 363b, 363c, respectively. The base 360 includes a first, second, and third static tracks 365a, 365b, 365c disposed on the inner surface of the base 360'. The first, second, and third movable tracks 363a, 363b, 363c are configured to translate along the first, second, third static track 365a, 365b, 365c, respectively, to achieve the contracted position shown in FIGS. 8C-8D. In a contemplated embodiment, some or all of the movable tracks 363a, 363b, 363c and static tracks 365a, 365b, 365c are on an outer surface of the respective movable or static member. In an embodiment, at least one of the first, second, and third static tracks 365a, 365b, 365c includes an endstop 367a, 367b, 367c, respectively, to prevent the movable tracks 363a, 363b, 363c from sliding beyond the base 360. In another embodiment, at least one of the first, second, and third movable tracks 363a, 363b, 363c includes an endstop. The inner surfaces 362a', 362b', 362c' of the first, second, and third movable members are adjacent to the base 360. The height H1 of the movable spinner assembly 362 in the contracted position shown in FIGS. 8C-8D is less than the height H2 of the movable spinner assembly 262 in the closed position shown in FIGS. 7A-7B. The shape and/or volume of the movable spinner assembly 362 is decreased in the contracted position as compared to the closed position shown in FIG. 7A.

In an alternate embodiment, the first, second, third movable tracks 363a, 363b, 363c and the corresponding static tracks 365a, 365b, 365c can be at an angle from 0 to 90 degrees relative to vertical or in a twisted orientation such that the first, second, and third movable members 362a, 362b, 362c slide in a helical orientation.

Figure 9A:
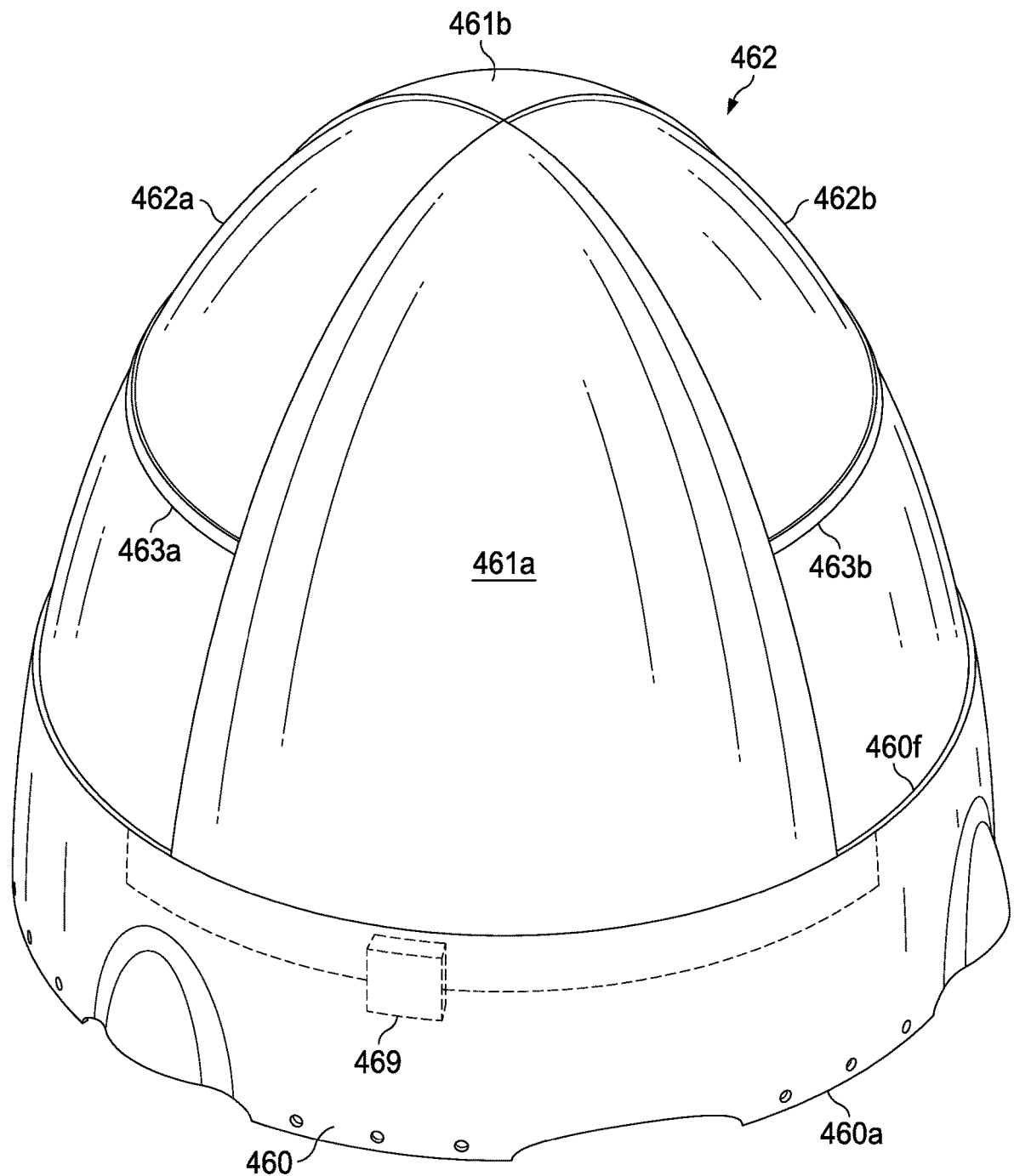
FIGS. 9A-9B are isometric views of a spinner fairing with two static members and two movable members in a closed position, according to one example embodiment.
Figure 9B:
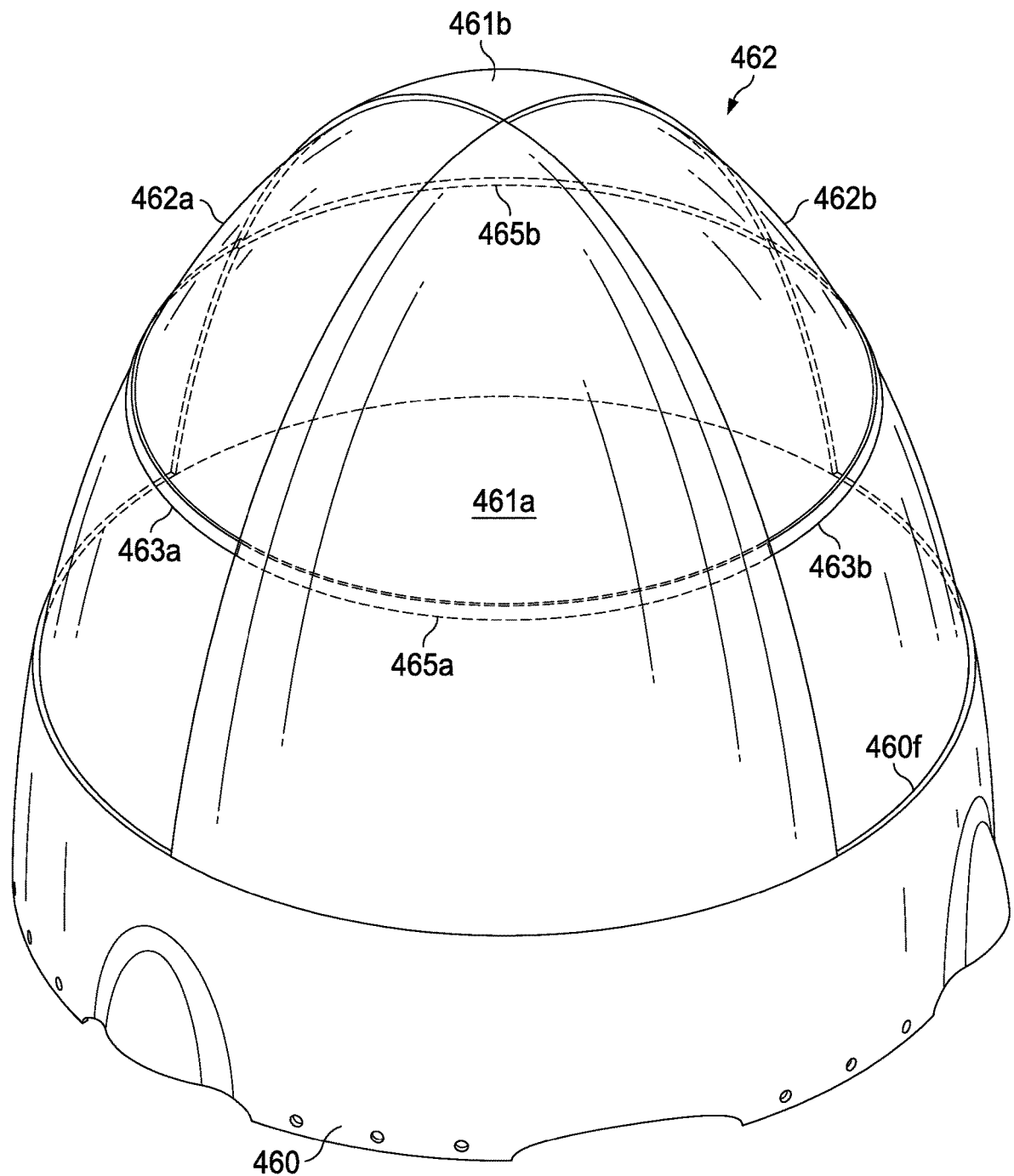
Figure 9C:
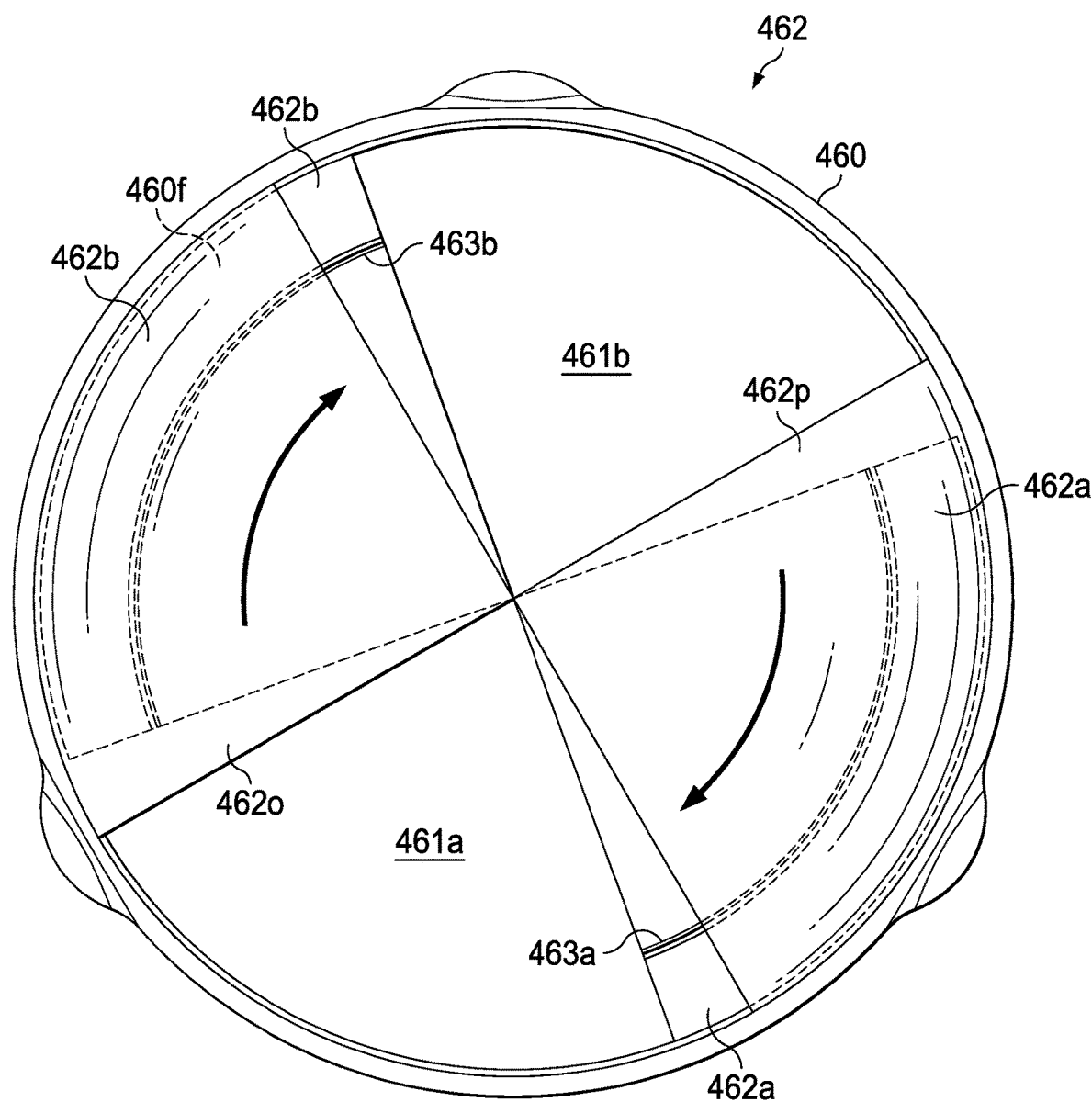
FIG. 9C is a top view of the spinner fairing shown in FIGS. 9A-9B illustrating the moveable members being slidably received by the two static members, according to one example embodiment.
Figure 9D:
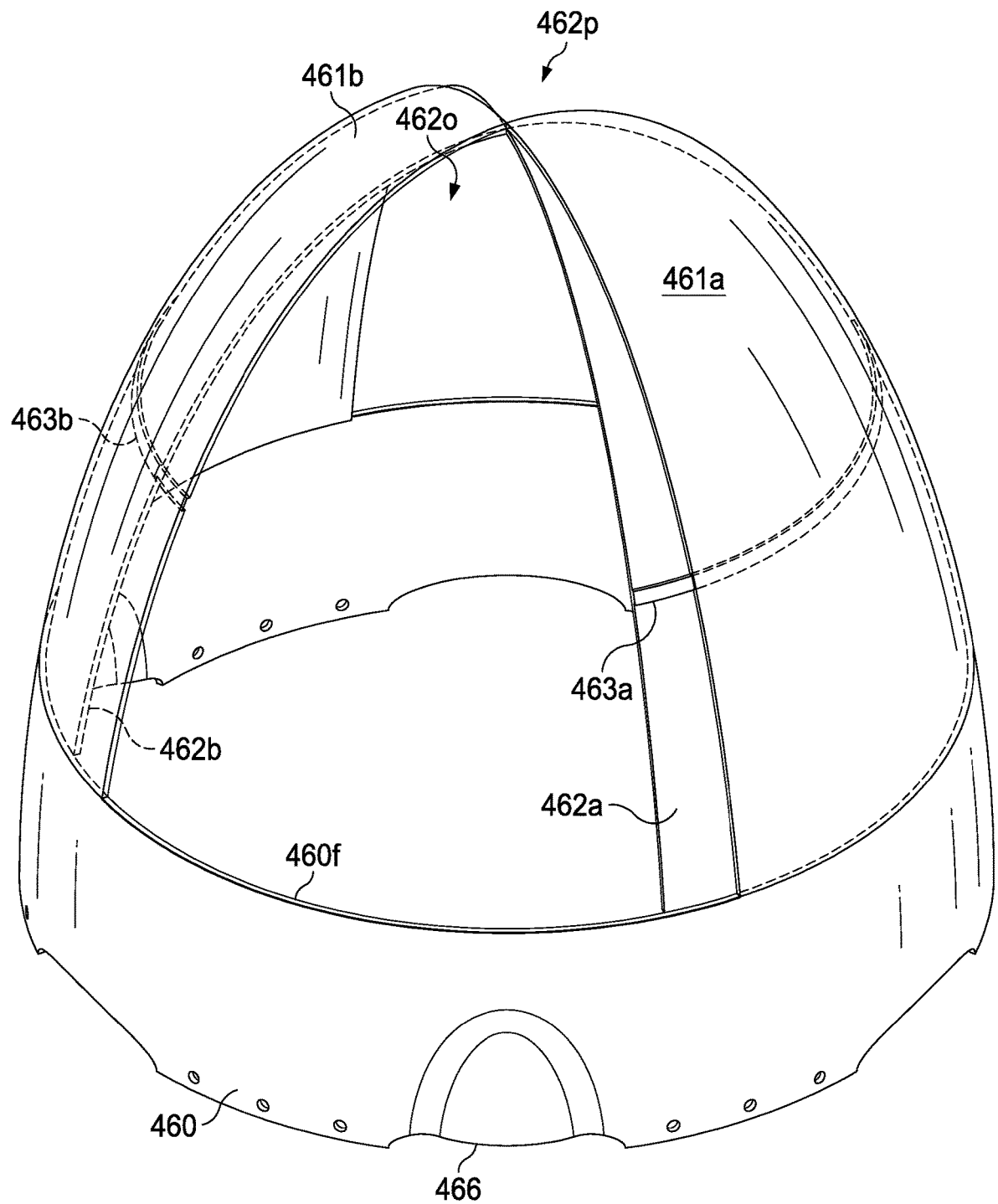
FIG. 9D is an isometric view of the spinner fairing shown in FIG. 9C near a completely open position, according to one example embodiment.

Referring now to FIGS. 9A-9D, an alternative embodiment of the movable spinner assembly 462 is illustrated. Movable spinner assembly 462 is similar in form and function to the assembly 362, except as noted herein. Thus, disclosure herein regarding assembly 62 is also applicable to assembly 362, except as noted herein. The movable spinner assembly 462 includes first and second static members 461a, 461b which are substantially similar to the movable members 362a, 362b, 362c in form except that the first static members 461a, 461b are fixedly connected to the base 460 and stationary during operation and movement of the first and second movable members 462a, 462b. The outer surfaces of the first and second movable members 462a, 462b each includes a first and second movable track 463a, 463b, respectively. First and second movable members 462a, 462b are positioned on a track on the forward edge of the 460f of the base 460 for rotating thereon. The inner surfaces of the first and second static members 461a, 461b each includes a first and second static track 465a, 465b, respectively. The first and second movable tracks 463a, 463b are engaged with the first and second static tracks 465a, 465b respectively. During opening, as shown in FIGS. 9C-9D, the first and second movable members 462a, 462b translate via the movable tracks 463a, 463b along the first and second static tracks 465a, 465b, respectively, and along the track located on the forward edge 460f of the base 460. During opening of the movable spinner assembly 462, the first and second movable members 462a, 462b slide under the adjacent first and second static member 461a, 461b, which provides a first and second access openings. 462o, 462p. The first and second access openings 462o, 462p can be used to access the hub system 440 (not shown).

In the illustrative embodiment, there can be two access openings 462o, 462p in the movable spinner assembly 462. It is contemplated that the movable spinner assembly 462 could include a variety of configurations including more or less access openings, for example, but not limitation, one, three, four, five, six, seven, eight, nine, ten, twenty, thirty or more access openings. In an embodiment, each of the first and second moveable members 462a, 462b can translate independently such that only one access opening 462o, 462p is provided.

In an embodiment, the first and second moveable members 462a, 462b can be moved manually or by an actuating system 469. An actuating system 469 can be provided on an interior surface of the base 460. The actuating system 469 can be an electric actuator that can independently move first and second movable members 462a, 462b.

Figure 10A:
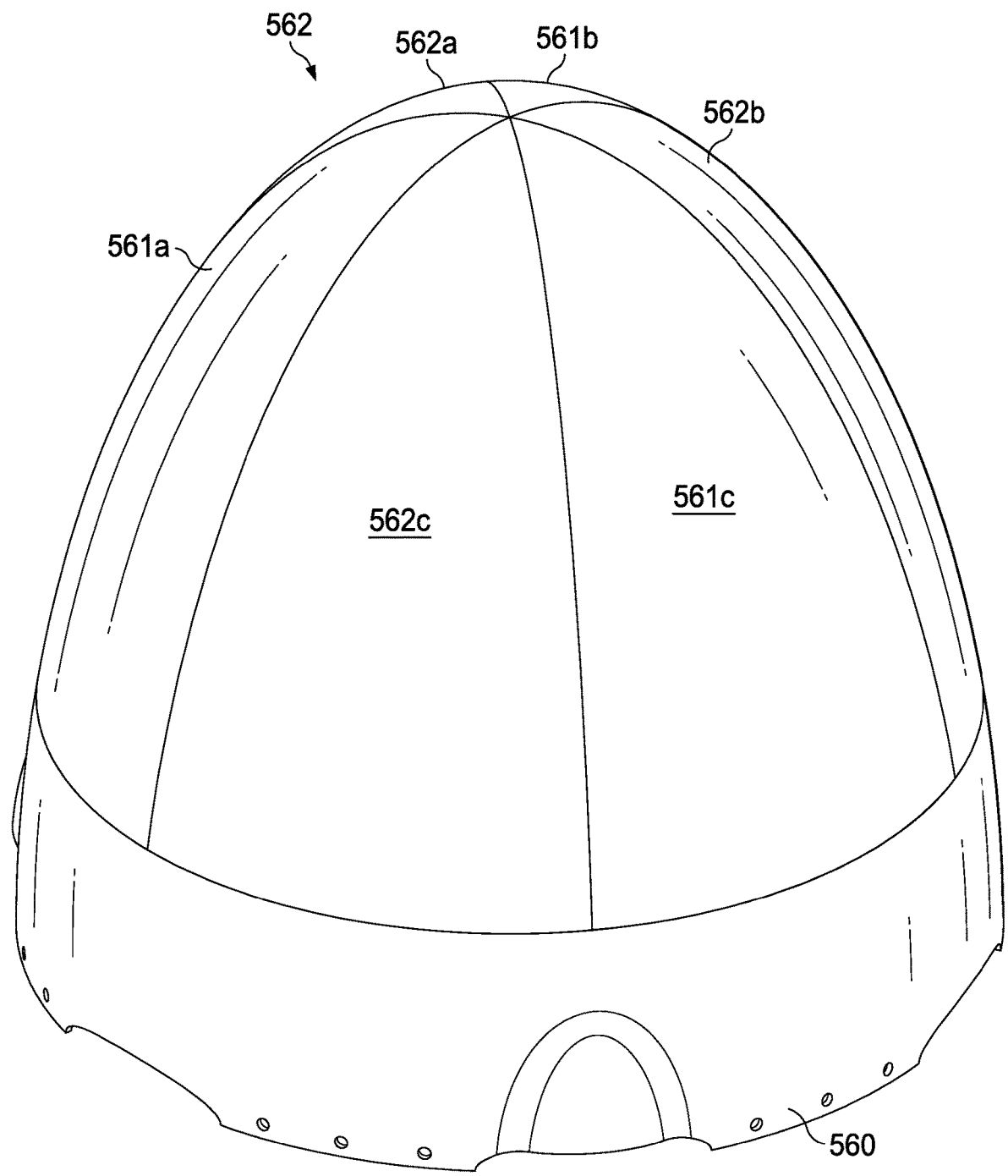
FIG. 10A is an isometric view of a spinner fairing with three static members and three moveable members in a closed position, according to one example embodiment.
Figure 10B:
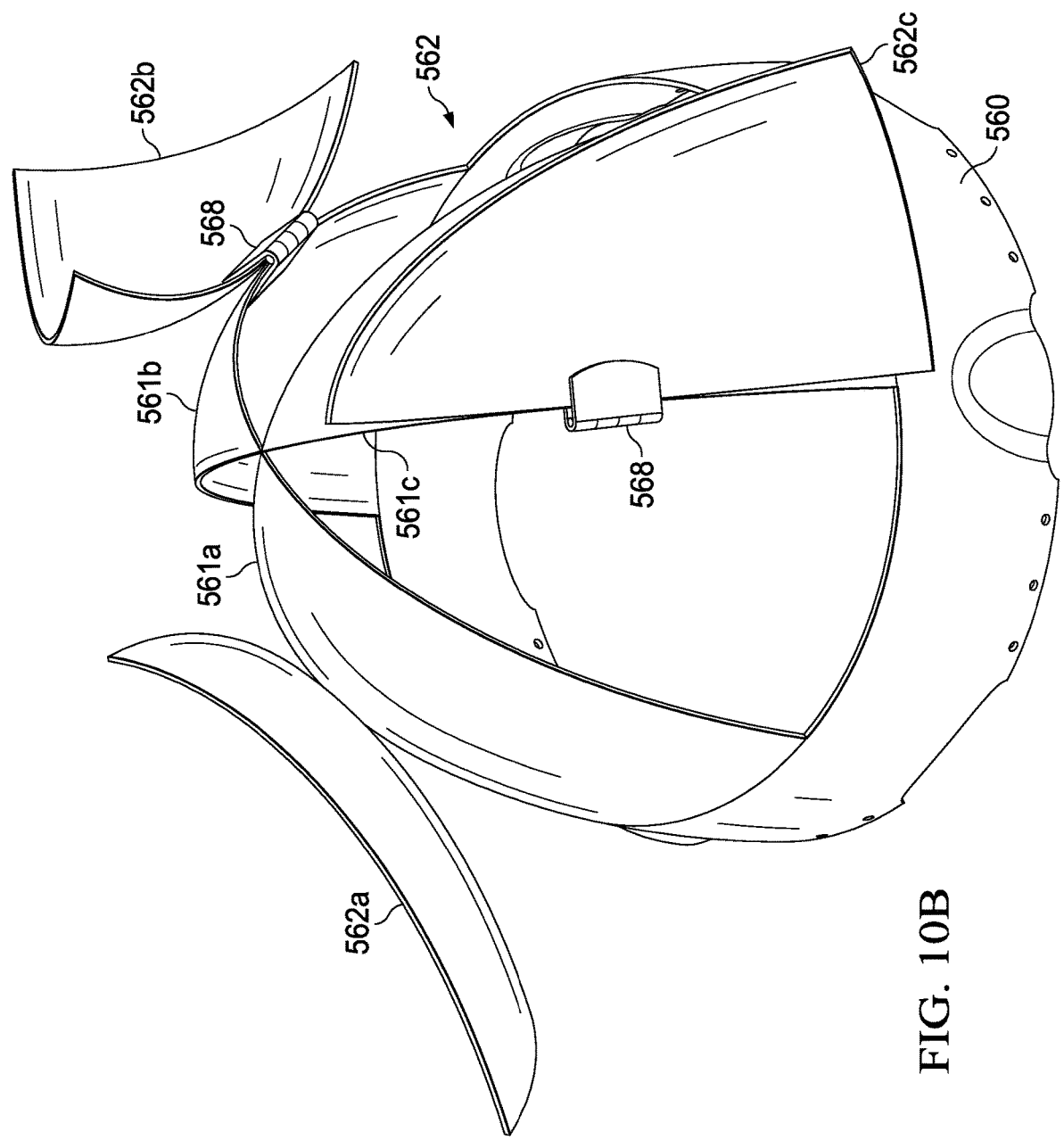
FIG. 10B is an isometric view of the spinner fairing shown in FIG. 10A with the three moveable members in an open position, according to one example embodiment.
Figure 10C:
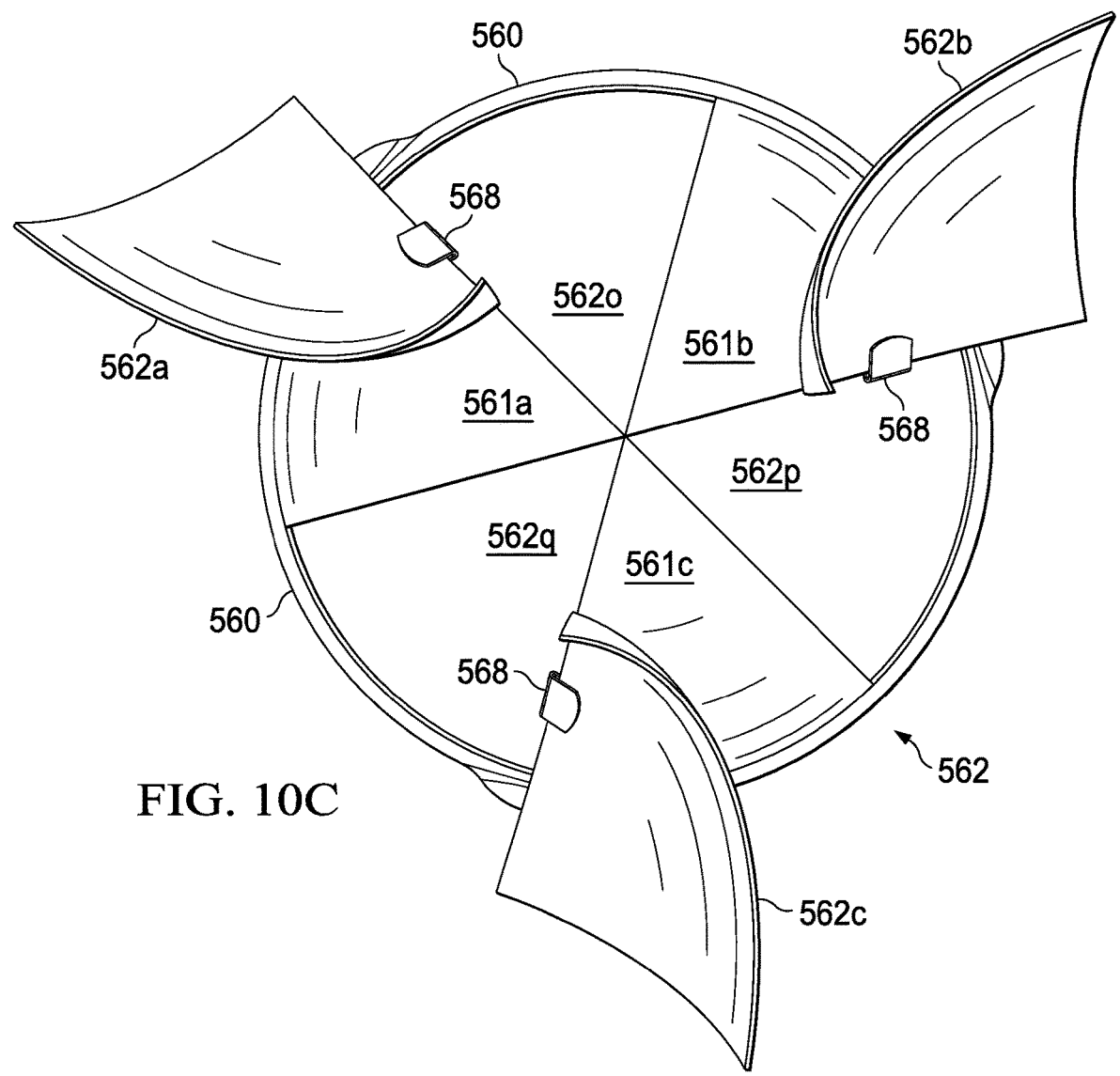
FIG. 10C is a top view of the spinner fairing shown in FIG. 10B, according to one example embodiment.
Figure 11A:
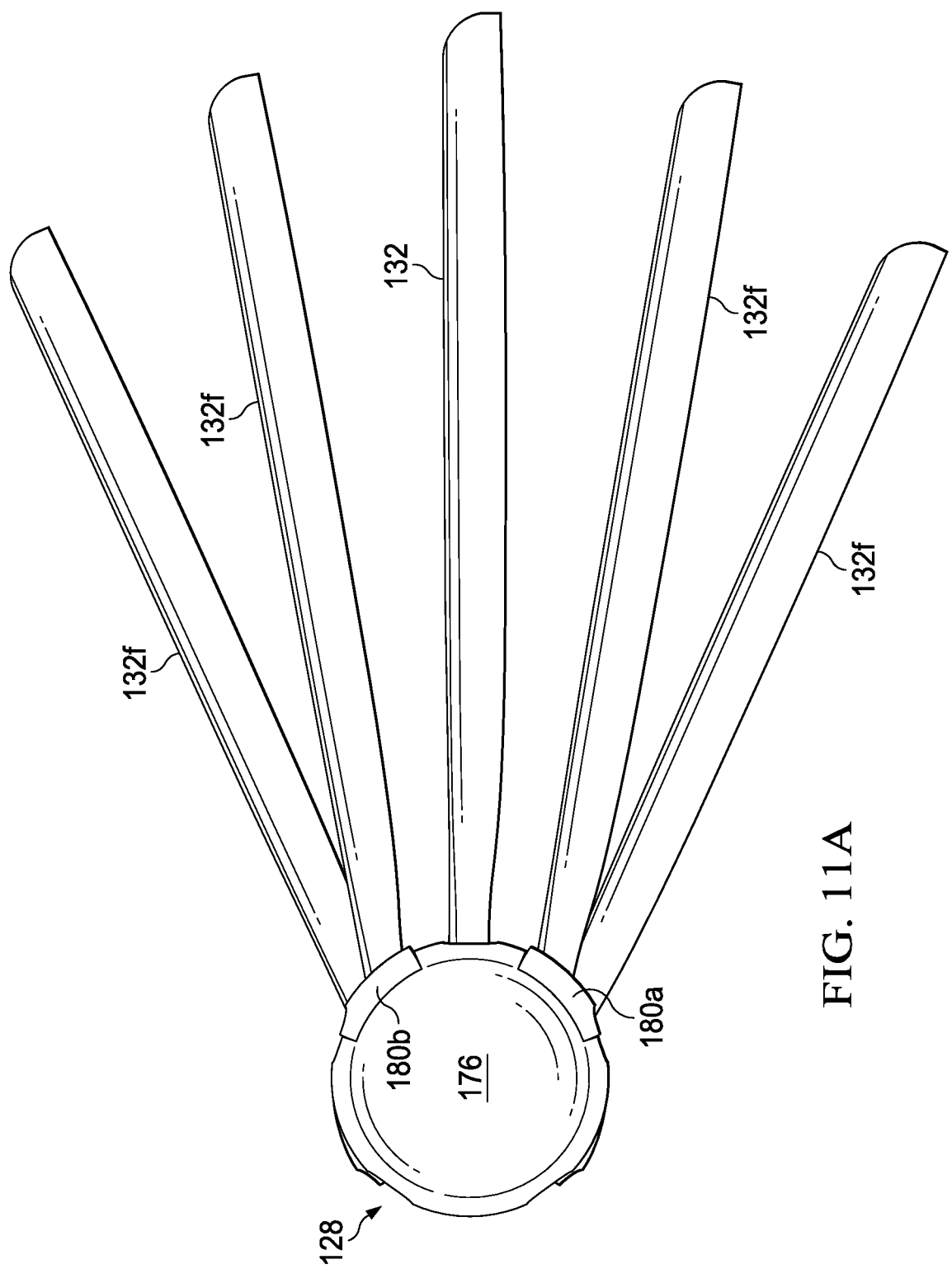
FIG. 11A is a top view of a rotor head fairing with pivotable upper and lower moveable members in an open position, according to one example embodiment.
Figure 11B:
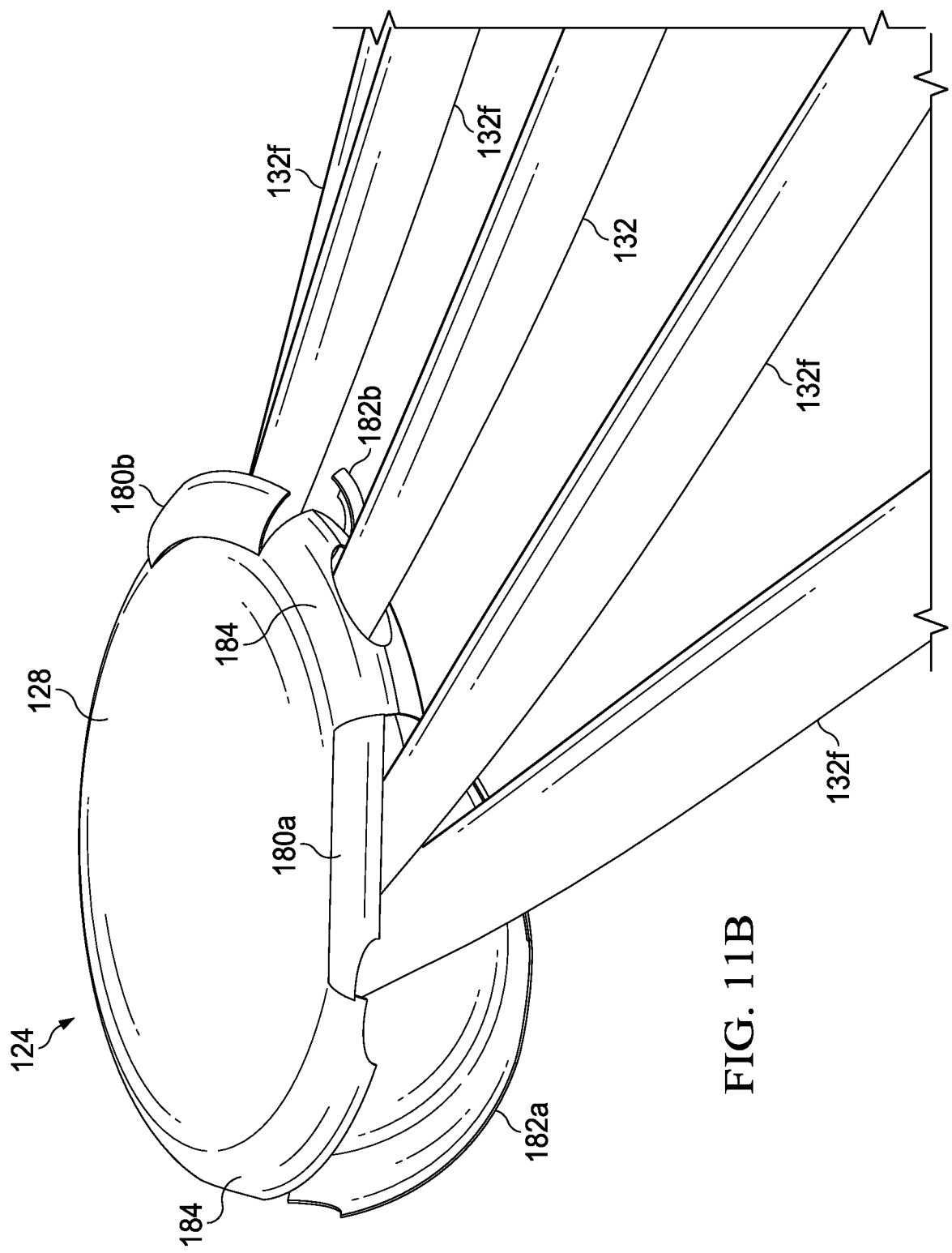
FIG. 11B is an isometric view of the rotor head fairing shown in FIG. 11A, according to one example embodiment.
Figure 11D:
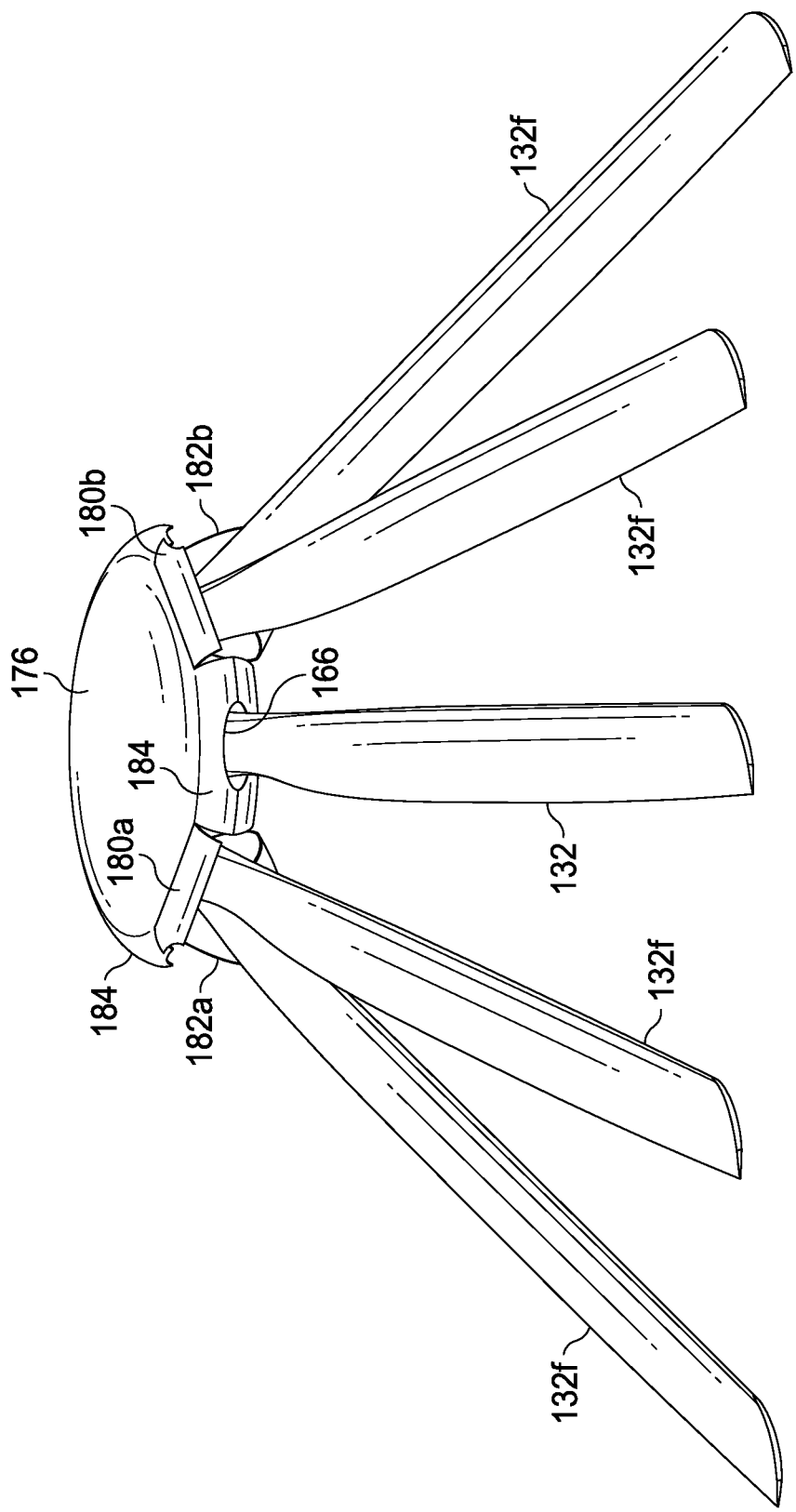
FIG. 11D is an isometric view of the rotor head fairing shown in FIG. 11A, according to one example embodiment.

Referring now to FIGS. 10A-10C, an alternative embodiment of the movable spinner assembly 562 is illustrated. Movable spinner assembly 562 is similar in form and function to the assemblies 62 and 462, except as noted herein. Thus, disclosure herein regarding assemblies 62 and 462 is also applicable to assembly 562, except as noted herein. The movable spinner assembly 562 includes first, second, and third static members 561a, 561b, 561c which are substantially similar to static members 461a, 461b in form except each static member 561a, 561b, 561c is smaller in size and does not include tracks 465a, 465b. The first, second, and third movable members 562a, 562b, 562c which are substantially similar to the first and second movable members 462a, 462b in form except each of the first, second and third movable members 562a, 562b, 562c is smaller in size and does not include the tracks 463a, 463b. Instead of sliding on the tracks, each of the first, second, and third movable member 562a, 562b, 562c is connected to the respective first, second, and third movable member 561a, 561b, 561c via a linkage 568. The movable spinner assembly 562 includes a plurality of linkages 568, each of which is provided one side of the first, second, and third static members 561a, 561b, 561c and on one side of the respective first, second, and third movable members 562a, 562b, 562c. The plurality of linkages 568 permit rotation of the first, second, and third movable members 562a, 562b, 562c about the linkage's fixed axis of rotation, as shown in FIGS. 10B-10C. In an embodiment, the plurality of linkages 568 can be one or more hinges. During opening, as shown in FIGS. 10B-10C, the first, second, and third movable members 562a, 562b, 562c rotate radially outward about the longitudinal axis of the respective linkage 568. Once the first, second, and third movable members 562a, 562b, 562c are in an open position, there is provided first, second, and third access openings 562o, 562p, 562q. The first, second, and third access opening 562o, 562p, 562q can be used to access the hub system 40 (not shown).

Figure 4:
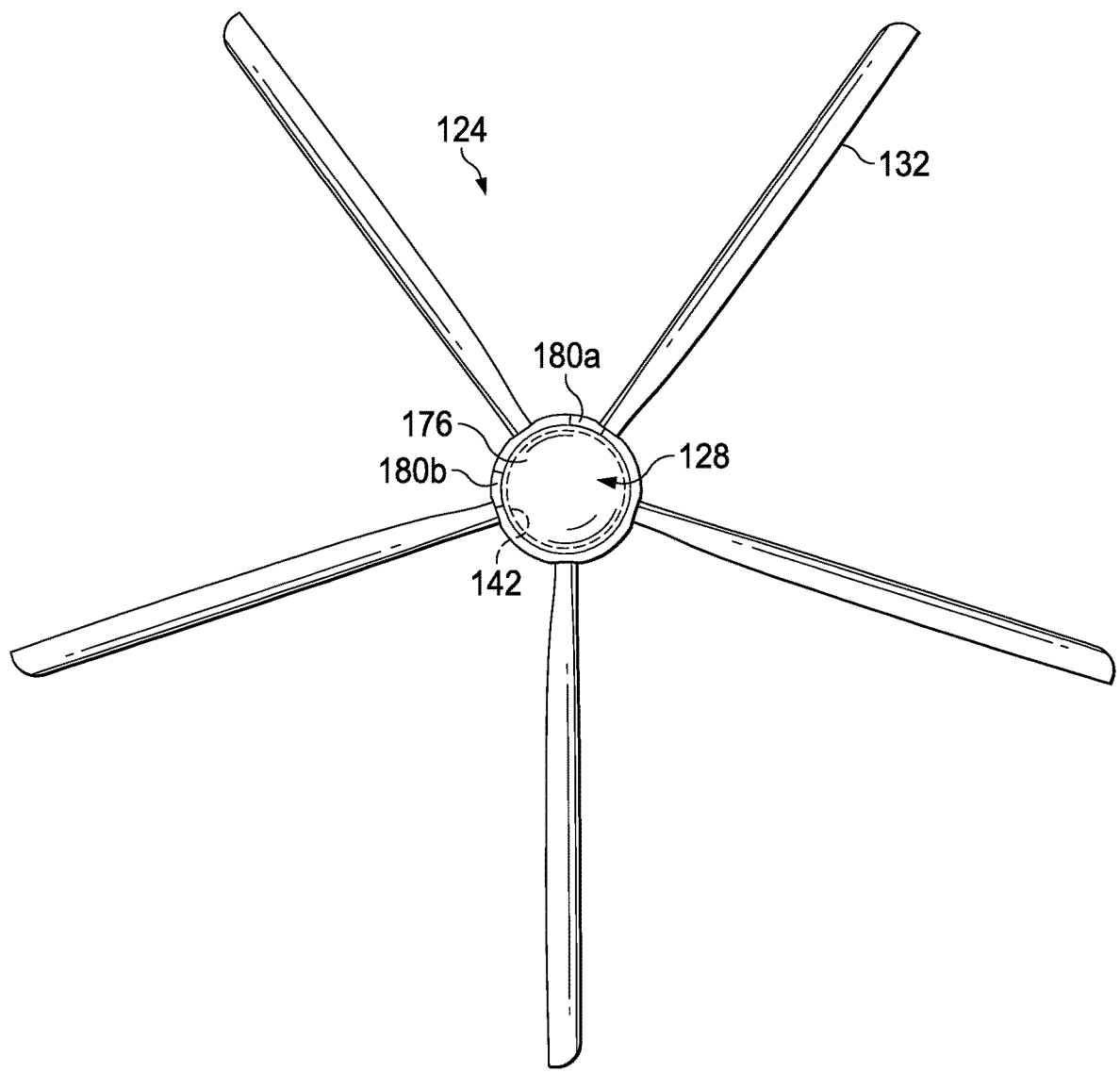
FIG. 4 is a top view of a rotor head fairing with associated rotor blades for a helicopter, according to one example embodiment.

FIGS. 3-4 illustrate helicopter 110 that includes rotor system 124 carried by fuselage 112. A plurality of rotor blades 132 is operably associated with rotor system 124 to provide flight for helicopter 110 and are controlled with a plurality of controllers within fuselage 112. For example, during flight a pilot can manipulate the cyclic controller 107 for changing the pitch angle of rotor blades 132 and/or manipulate pedals 111, thus providing vertical, horizontal, and yaw flight movement.

A rotor head fairing assembly 128 is connected to and rotates with a hub system 140 during operation. The rotor head fairing assembly 128 is connected to a spinner support 142 using conventional fasteners such as rivets, screws, bolts. The spinner support 142 is associated and rotates with hub system 140 during operation. During flight, rotor head fairing 128 has an aerodynamic shape that diverts air towards rotor blades 132, thereby increasing the aerodynamic efficiency of the rotor system 124. Rotor head fairing 128 can help reduce overall aircraft drag by fairing over the hub system 140 components. The plurality of the rotor blades 132 are shown in a closed position having an aerodynamic shape for flight in FIGS. 3-4. In order to protect the blades 132 while the helicopter 110 is stored, the main rotor blades 132 can be rotated to a folded position to minimize the footprint of the helicopter, as shown in FIGS. 11A-11D. Rotor head fairing assembly 128 can include movable components that move from a closed position, as shown in FIGS. 3-4, to an open position, as shown in FIGS. 11A-11D. The rotor head fairing assembly 128 can include an upper housing 176 and a lower housing 178. The upper and lower housings 176, 178 can include upper movable members 180a, 180b and lower movable members 182a, 182b that can be actuated to provide clearance for a rotated or folded rotor blade 132f when in a stowed state. The movable components (e.g., upper and lower movable members 180a, 180b, 182a, 182b) can be moved manually or by an actuating system.

Referring now to FIGS. 11A-11D, the rotor head fairing assembly 128 is illustrated in an open position to provide clearance for the folded rotor blades 132f. The rotor head fairing assembly 128 includes upper housing 176 with first and second upper movable members 180a, 180b that can be pivotally connected thereto. The lower housing 178 can include first and second lower movable members 182a, 182b that can be pivotally connected thereto. In an embodiment, all of the first and second upper movable members 180a, 180b and the first and second lower movable members 182a, 182b are pivoted away from a central axis C by an actuating system to provide clearance for folded blades 132f. In other embodiments, only the first and second upper movable members 180a, 180b are pivoted away from central axis C to provide clearance for folded blades 132f. In another embodiment, only the first and second lower movable members 182a, 182b are pivoted away from central axis C to provide clearance for folded blades 132f. In an embodiment, the actuating system could be at least one of the following: an electric linear actuator, an electric rotary actuator, and an electric ball screw actuator.

In an embodiment, the rotor head fairing assembly 128 includes four movable aerodynamic components: first and second upper movable members 180a, 180b and first and second lower movable members 182a, 182b. It is contemplated that rotor head fairing assembly 128 could include a variety of configurations of the movable aerodynamic components that can include two, three, five, six, seven, eight, nine, ten, or more movable aerodynamic components.

It is further contemplated that the movable aerodynamic components of the rotor head fairing assembly 128 could come in a variety of shapes and sizes. First and second upper movable members 180a, 180b can be generally an elongated curved door around the outer circumference of the upper housing 176. First and second lower movable members 182a, 182b can be generally an inwardly extending curved door located around the outer circumference of the lower housing 178. In some embodiments, the first and second upper movable members 180a, 180b are substantially similar in width to the first and second lower movable members 182a, 182b. In other embodiments, the first and second upper movable members 180a, 180b are different in width to the first and second lower movable members 182a, 182b (e.g. the lower movable members 182a, 182b can be wider and/or longer than the upper movable members 180a, 180b and vice versa). In an embodiment shown in FIGS. 11A-11D, the first and second upper and lower movable members 180a, 180b, 182a, 182b extend only partially around the circumference of the rotor head fairing 28 such that a non-movable side portion 184 is located therebetween. The non-movable side portion 184 can include one or more fairing ports 166. In another embodiment, the first and second upper and lower movable members 180a, 180b, 182a, 182b can be adjacent to one another and can define a fairing port 166.

Rotor head fairing 128 and the movable components associated therewith may be formed of a metal, a plastic, a glass fiber, a carbon fiber, other composite materials, any other rigid or semi-rigid material, or combinations thereof. In an embodiment, the rotor head fairing 128 has an aerodynamic shape when in a closed position that can be generally rounded (e.g., parabolic, conical, spherical, egg shaped, bullet shaped, bell shaped, disc shaped, etc.).

Figure 12A:
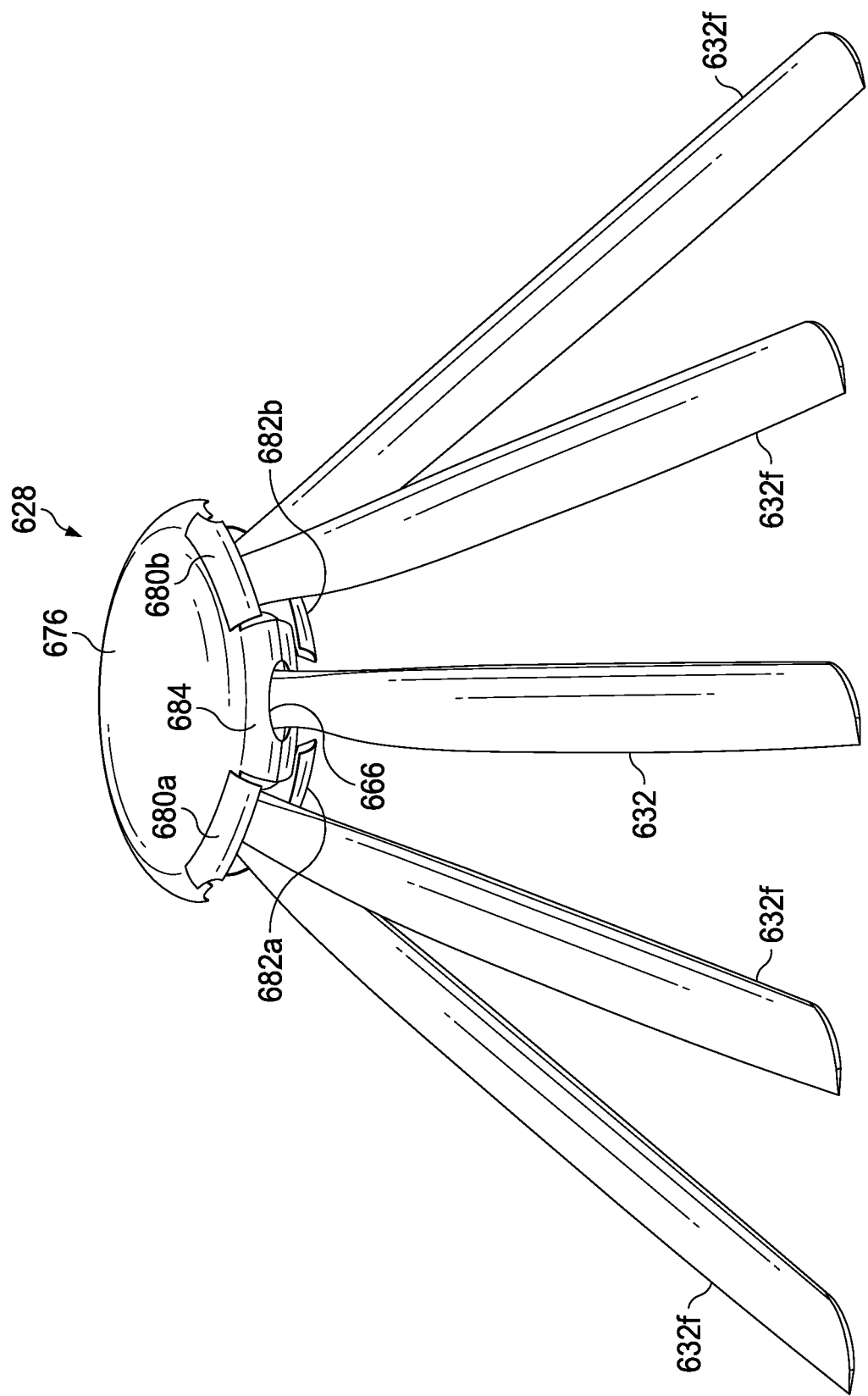
FIG. 12A is an isometric view of a rotor head fairing with retractable upper and lower moveable members in an open position, according to one example embodiment.
Figure 12B:
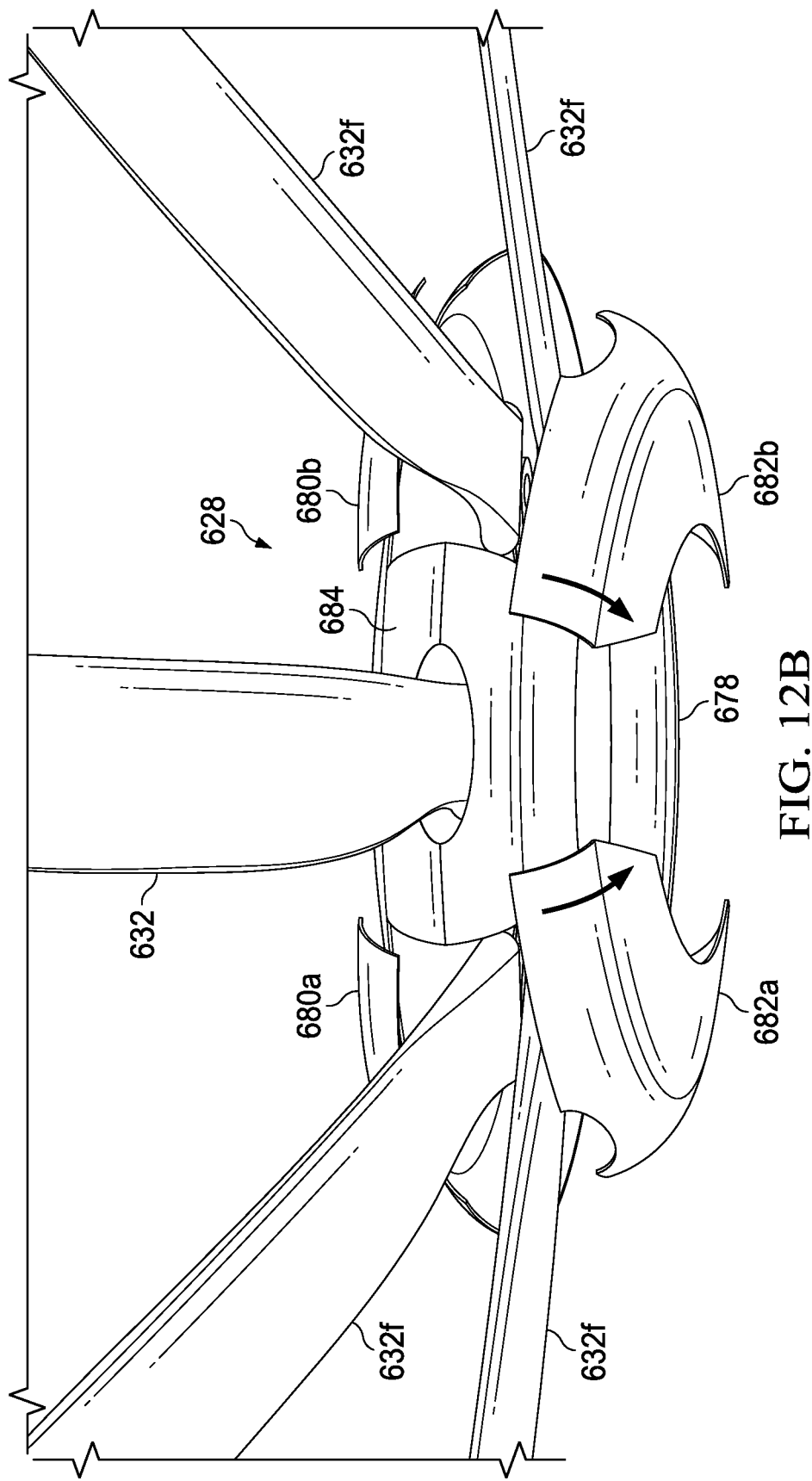
FIG. 12B is a bottom isometric view of the rotor head fairing shown in FIG. 12A, according to one example embodiment.
Figure 12C:
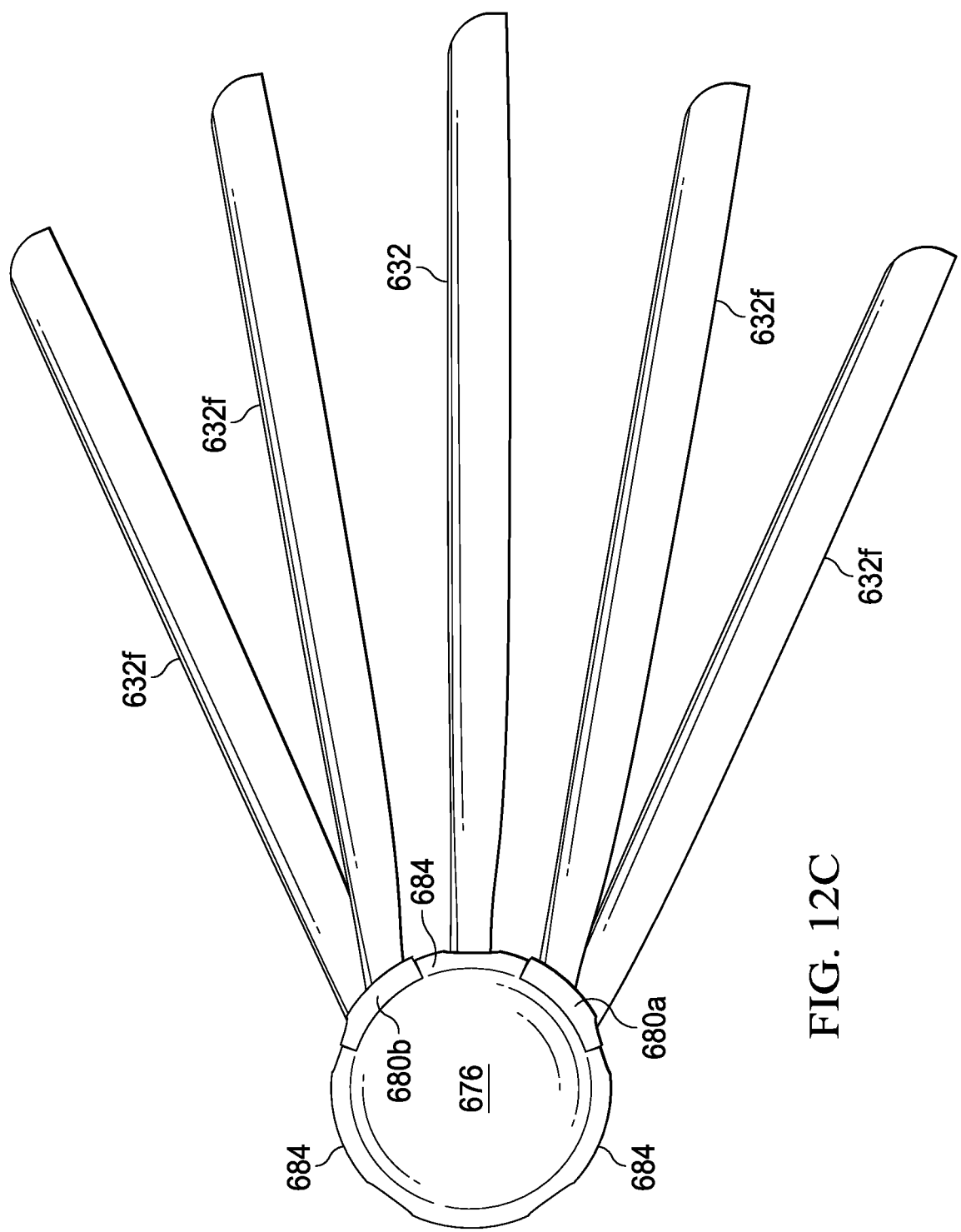
FIG. 12C is a top isometric view of the rotor head fairing shown in FIG. 12A, according to one example embodiment.

Referring now to FIGS. 12A-12C, an alternative embodiment of the rotor head fairing 628 is illustrated. Rotor head fairing 628 is similar in form and function to the rotor head fairing 128, except as noted herein. Thus, disclosure herein regarding assemblies 128 is also applicable to rotor head fairing 628, except as noted herein. Each of the first and second upper and lower movable members 680a, 680b, 682a, 682b are configured to retract toward the hub system 640 (not shown) or generally inward to provide clearance for the folded blades 632f.

Figure 13A:
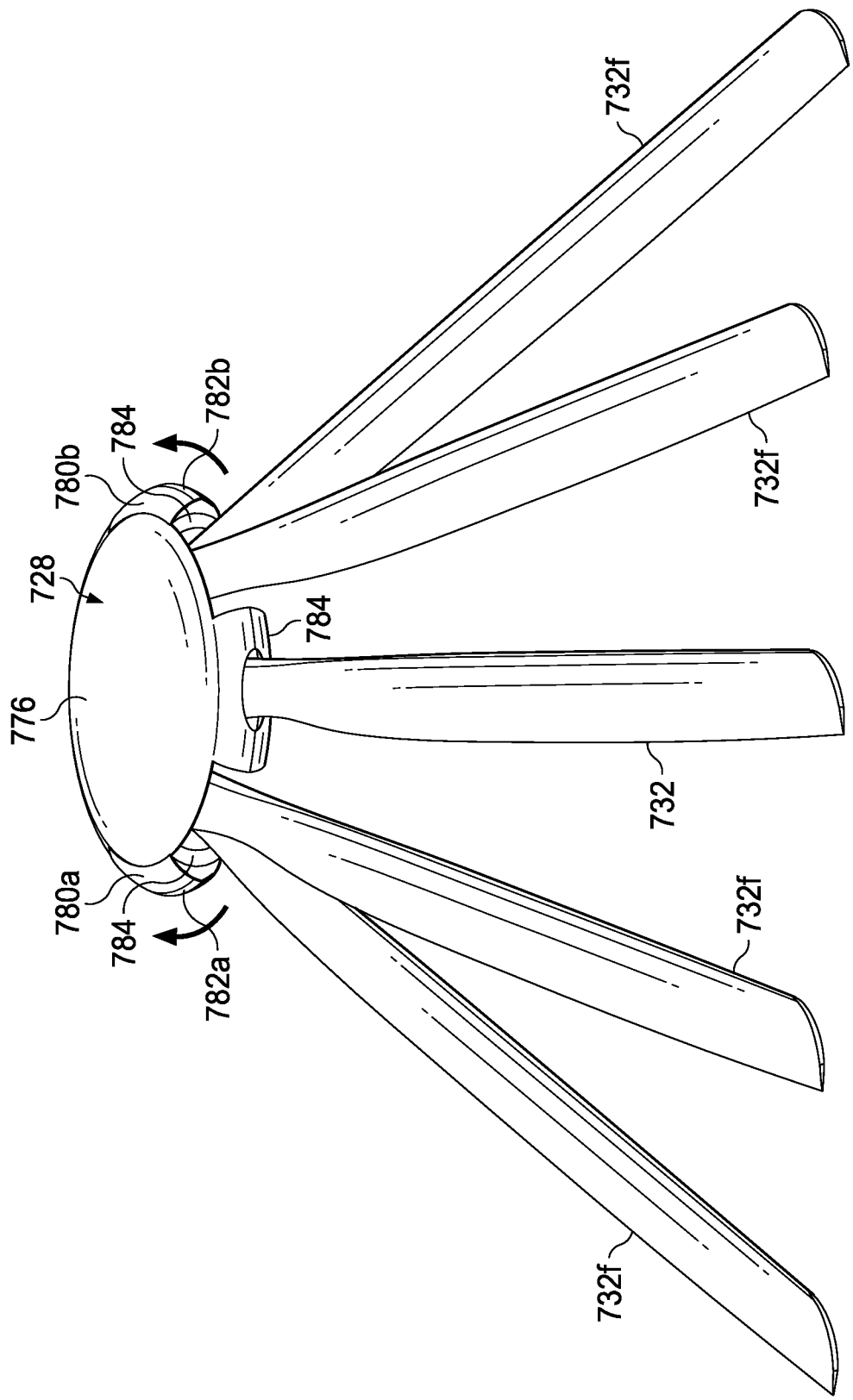
FIG. 13A is an isometric view of a rotor head fairing with slidable upper and lower moveable members in an open position, according to one example embodiment.
Figure 13B:
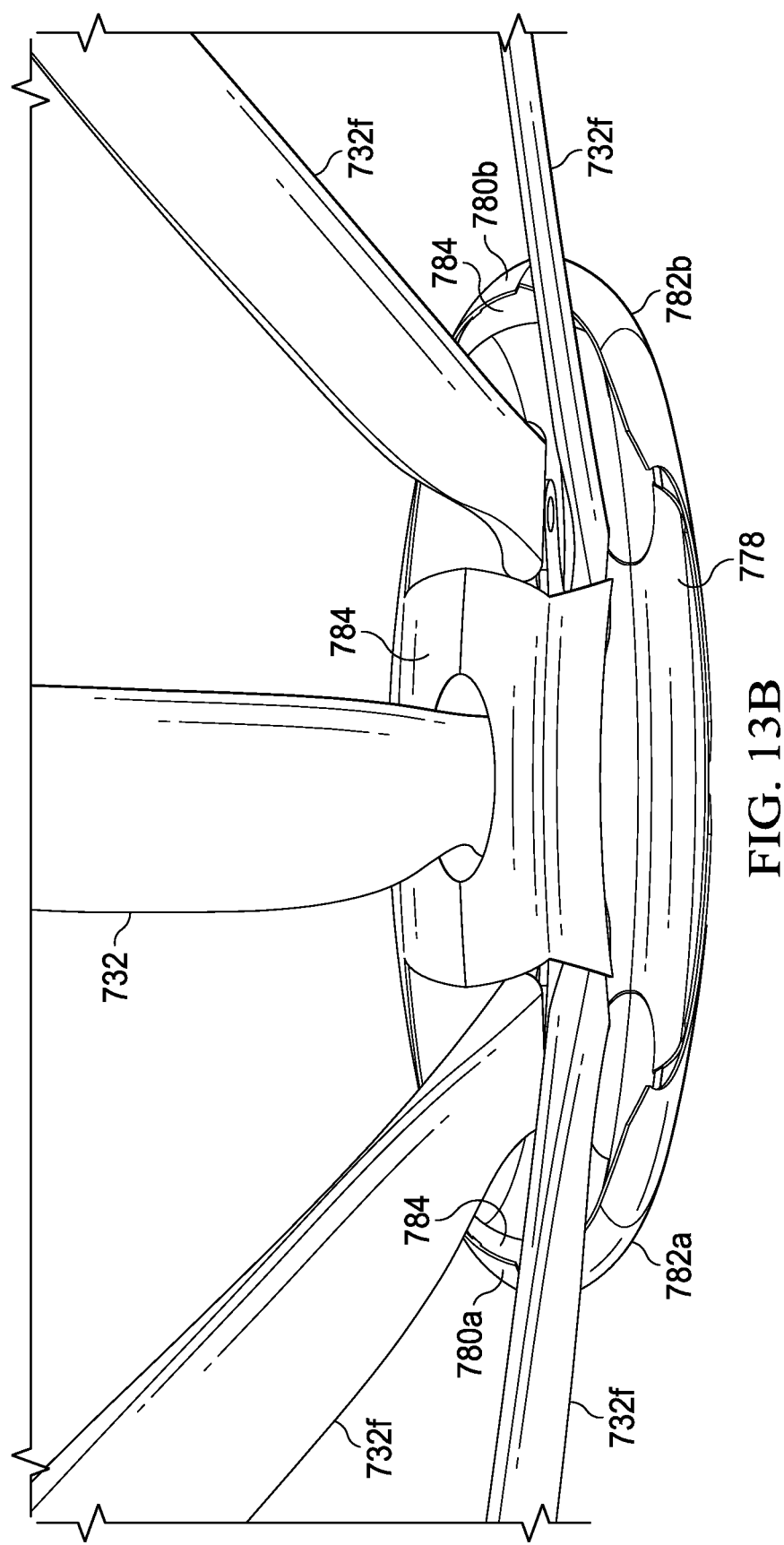
FIG. 13B is a bottom isometric view of the rotor head fairing shown in FIG. 13A, according to one example embodiment.

Referring now to FIGS. 13A-13B, an alternative embodiment of the rotor head fairing 728 is illustrated. Rotor head fairing 728 is similar in form and function to the rotor head fairing 128, except as noted herein. Thus, disclosure herein regarding assemblies 128 is also applicable to rotor head fairing 728, except as noted herein. Each of the first and second upper and lower movable members 780a, 780b, 782a, 782b are configured to be slidable relative to the periphery of the upper and lower housing 776, 778, respectively. Each of the first and second upper and lower movable members 780a, 780b, 782a, 782b can be positioned over non-movable side portions 784.

Figure 14A:
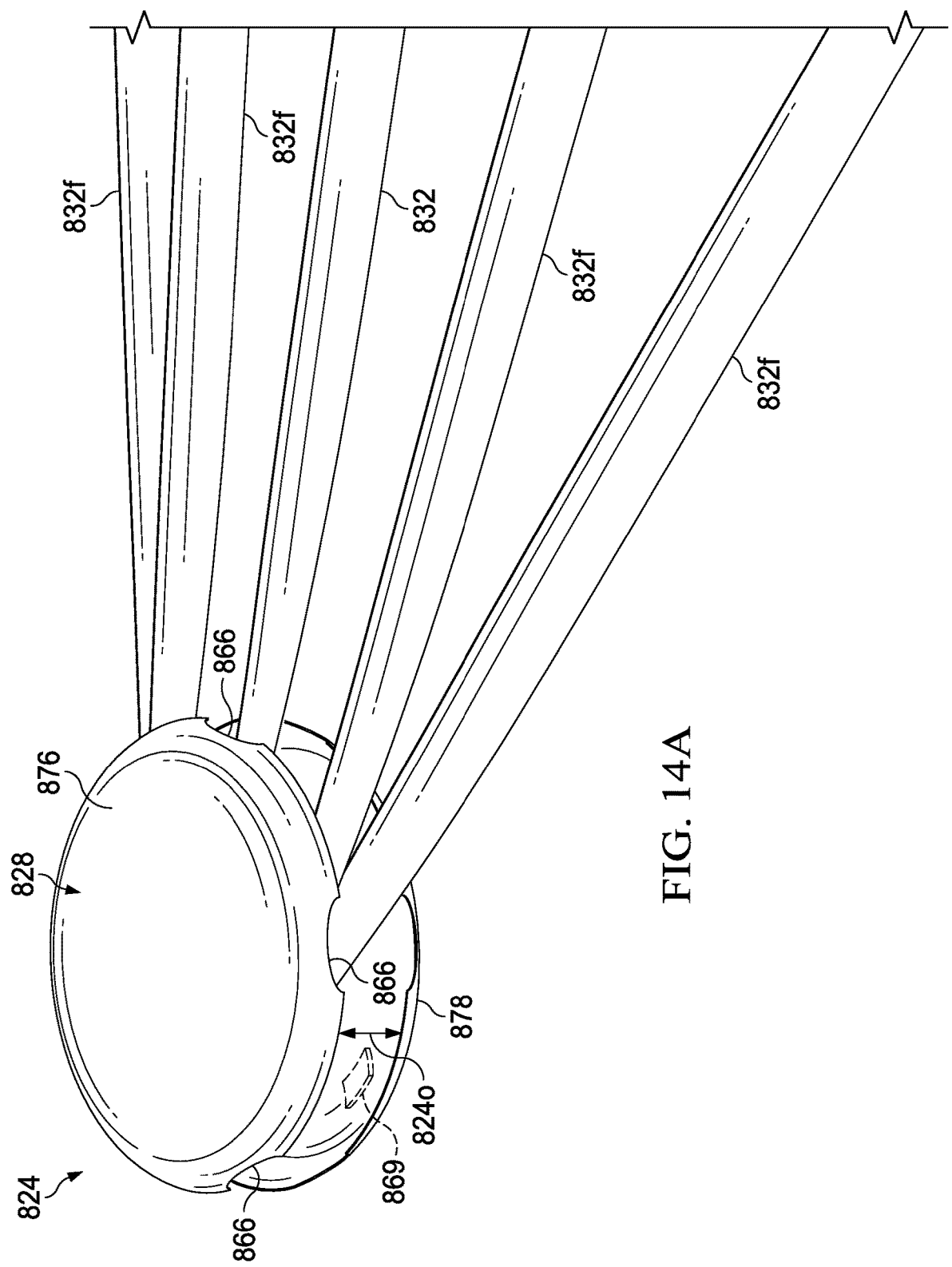
Figure 14B:
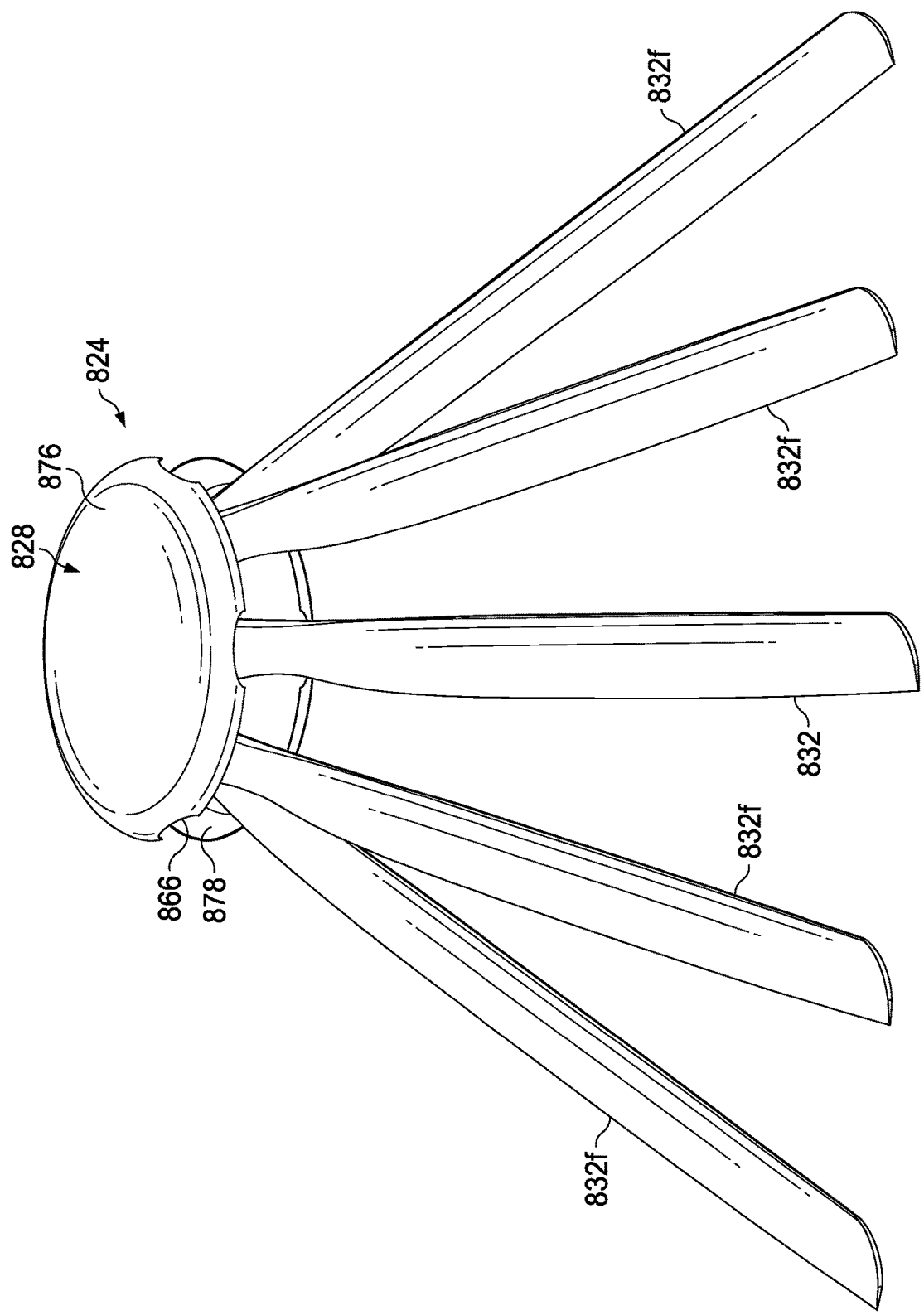

Referring now to FIGS. 14A-14C, an alternative embodiment of the rotor head fairing 828 is illustrated. Rotor head fairing 828 is similar in form and function to the rotor head fairing 128, except as noted herein. The rotor head fairing 828 includes upper and lower housings 876, 878 that can be movable manually and/or by an actuating system 869. In one embodiment shown in FIG. 14B, the lower housing 878 moves downward to provide clearance for folded rotor blades 832f. In an embodiment shown in FIG. 14C, upper housing 876 can be moved upward to provide clearance for folded rotor blades 832f. In other embodiments, both the upper and lower housings can be moved away from a central axis C of the rotor head fairing 828 so as to define an opening 824o therebetween.

The illustrative embodiments of the spinner fairing and the rotor head fairing described herein can advantageously provide at least one of the following: a folding and/or collapsible spinner for a proprotor or propeller aircraft that permits ease of access for maintenance and inspection of the underlying structural and/or electrical components without complete removal of the spinner fairing; the movable spinner assembly can be configured to fold or collapse in order to reduce the envelope or effective volume of the spinner assembly by a range of 5-100%, which is useful for an aircraft that is required to be stowed or parked in a confined space such as a hangar or shipboard compartment; conventional spinners contribute to either the overall length or width of an aircraft so any reduction in the stowed aircraft size using the movable spinner assembly could improve storage options; the movable spinner assembly can permit longer, sharper, and more aerodynamic spinner configurations without space limitations of conventional spinners; and the movable members can provide access for maintenance and inspection operations.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l-k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A spinner fairing, comprising:
a base configured to be fixed relative to a hub system;
a movable spinner assembly movable relative to the base;
the movable spinner assembly comprising a first movable member and a second movable member; and
one or more internal hinges disposed on the base and on each of the first and second movable members, the one or more internal hinges attaches the respective first and second movable member to the base;
wherein each of the first and second movable members being selectively configurable between a closed position, in which the first and second movable members are positioned adjacent to each other to define a closed aerodynamic shape of the movable spinner assembly, and an open position, in which the first and second movable members are positioned to decrease the volume of the movable spinner assembly as compared to the closed aerodynamic shape.

2. The spinner fairing of claim 1, further comprising: an actuating system mounted within the base for moving the movable spinner assembly.

3. The spinner fairing of claim 1, wherein each first and second movable members being pivotably mounted to the base via the one or more internal hinges.

4. The spinner fairing of claim 3, wherein when the movable spinner assembly is in the open position at least one of the first and second movable members is positioned inwardly towards the base.

5. The spinner fairing of claim 3, wherein when the movable spinner assembly is in the open position at least one of the first and second movable members extends radially outward from the base.

6. The spinner fairing of claim 5, wherein the first and second movable members are aft of a first forward member and a second forward member, at least one of the first forward member and the second forward member is positioned inwardly towards the base when in the open position.

7. The spinner fairing of claim 1 wherein when the movable spinner assembly is in the open position the inner surfaces of the first and second movable members are adjacent to the base.

8. A spinner fairing, comprising:
a base configured to be fixed relative to a hub system; and
a movable spinner assembly comprising:
a first static member connected to the base;
a first moveable member movably mounted to the first static member via a first linkage, the first moveable member arranged to cover a first access opening;
a first linkage connected to the first static member and the first moveable member, the first linkage permits rotation of the first movable member radially outward about a longitudinal axis of the first linkage;
a second static member connected to the base; and
a second moveable member movably mounted to the second static member, the second movable member arranged to cover a second access opening;
a second linkage connected to the second static member and the second moveable member, the second linkage permits rotation of the second movable member radially outward about a longitudinal axis of the second linkage;
wherein each first and second movable members being selectively configurable between a closed position, in which the movable spinner assembly has an aerodynamic shape, and an open position, in which the first movable member and the second movable member extend radially outward via the first and second linkages to expose the first and second access openings, respectively.

9. The spinner fairing of claim 8, further comprising an actuating system for moving the first and second moveable members.

10. The spinner fairing of claim 8, wherein the first and second linkages are each at least one hinge.

11. The spinner fairing of claim 10, wherein the at least one hinge is connected on one side of the respective first or second static member and on the opposite side to the respective first or second movable member.

12. A rotor head fairing assembly, comprising:
an upper housing and a lower housing disposed below the upper housing, the upper housing and the lower housing coupled to a hub system, the upper housing and the lower housing define a central axis therebetween, the upper housing and lower housing configured to receive a plurality of rotor blades therebetween;
the upper housing comprising an upper movable member disposed above the central axis;
the lower housing comprising a lower movable member disposed below the central axis;
wherein each upper and lower movable member being selectively configurable between a closed position, in which the upper housing and lower housing define an aerodynamic shape and are disposed adjacent to the central axis, and an open position, in which the upper and lower movable members are moved away from the central axis to provide clearance therebetween for rotor blades in a stowed state.

13. The rotor head fairing according to claim 12, wherein at least one of the upper moveable member and the lower movable member is pivotally connected to the respective housing.

14. The rotor head fairing according to claim 12, wherein at least one of the upper moveable member and the lower movable member is configured to retract in a direction toward the hub system when in an open position.

15. A rotor head fairing, comprising:
an upper housing and a lower housing disposed below the upper housing, the upper housing and the lower housing coupled to a hub system, the upper housing and the lower housing define a central axis therebetween, the upper housing and the lower housing configured to receive a plurality of rotor blades therebetween;
an actuating system for moving the lower housing;
wherein the lower housing is selectively configurable between a closed position, in which the upper and lower housing together define an aerodynamic shape, and an open position, in which the lower housing is moved downward away from the central axis to provide clearance for rotor blades in a stowed position.

16. A rotor head fairing, comprising:
an upper housing and a lower housing disposed below the upper housing, the upper housing and the lower housing coupled to a hub system, the upper housing and the lower housing define a central axis therebetween, the upper housing and the lower housing configured to receive a plurality of rotor blades therebetween;
an actuating system for moving the lower housing;
wherein the upper housing is selectively configurable between a closed position, in which the upper and lower housing together define an aerodynamic shape, and an open position, in which the upper housing is moved upward away from the central axis to provide clearance for rotor blades in a stowed position.

17. A spinner fairing, comprising:
a base configured to be fixed relative to a hub system;
a movable spinner assembly movable relative to the base;
the movable spinner assembly comprising a first movable member and a second movable member;
wherein each first and second movable member being selectively configurable between a closed position, in which the movable spinner assembly has an aerodynamic shape, and a contracted position, in which the movable spinner assembly has a decreased shape;
wherein the base further comprises a first static track and second static track, each first and second moveable members further comprises a movable track,
the first movable track is configured to translate along the first static track during opening of the first movable member to the contracted position; and
the second movable track is configured to translate along the second static track during opening of the second movable member to the contracted position.

18. The spinner fairing of claim 17, wherein at least one of the first static track and the first movable track further comprises an endstop; and at least one of the second static track and the second movable track further comprises an endstop.

19. A spinner fairing, comprising:
a base configured to be fixed relative to a hub system; and
a movable spinner assembly comprising:
a first static member connected to the base, the first static member comprises a first static track;
a first moveable member configured to be movably mounted to the first static member, the first moveable member arranged to cover a first access opening, the first movable member comprising a first movable track;
a second static member connected to the base, the second static member comprises a second static track; and
a second moveable member movably mounted to the second static member, the second movable member arranged to cover a second access opening, the second movable member comprising a second movable track;
wherein each first and second movable members being selectively configurable between a closed position, in which the movable spinner assembly has an aerodynamic shape, and an open position, in which the movable spinner assembly includes first and second access openings;
wherein the first movable track is configured to translate along the first static track during opening of the first movable member to the open position; and the second movable track is configured to translate along the second static track during opening of the second movable member to the open position.

20. The spinner fairing of claim 19, wherein the base further comprises a track on the forward edge for sliding at least one of the first and second movable members thereon.

21. A rotor head fairing assembly, comprising:
an upper housing and a lower housing disposed below the upper housing, the upper housing and the lower housing coupled to a hub system, the upper housing and the lower housing having a periphery;
the upper housing comprising an upper movable member;
the lower housing comprising a lower movable member;
wherein each upper and lower movable member being selectively configurable between a closed position, in which the upper housing and lower housing define an aerodynamic shape and enclosing the periphery, and an open position, in which the upper and lower movable members are slidable relative to the periphery to define an opening for rotor blades in a stowed state.

\* \* \* \* \*